US012688235B2

(12) United States Patent
Lott et al.

(10) Patent No.: US 12,688,235 B2
(45) Date of Patent: *Jul. 21, 2026

(54) SPECULATIVE DECODING IN AUTOREGRESSIVE GENERATIVE ARTIFICIAL INTELLIGENCE MODELS

(71) Applicant: QUALCOMM Incorporated, San Diego, CA (US)

(72) Inventors: Christopher Lott, San Diego, CA (US); Mingu Lee, San Diego, CA (US); Wonseok Jeon, San Diego, CA (US); Roland Memisevic, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/012,626

(22) Filed: Jan. 7, 2025

(65) Prior Publication Data

US 2025/0148015 A1 May 8, 2025

Related U.S. Application Data

(63) Continuation of application No. 18/538,965, filed on Dec. 13, 2023, now Pat. No. 12,229,192.

(Continued)

(51) Int. Cl.
*G06F 16/901* (2019.01)
*G06F 40/284* (2020.01)

(52) U.S. Cl.
CPC ........ *G06F 16/9027* (2019.01); *G06F 40/284* (2020.01)

(58) Field of Classification Search
CPC .......................... G06F 16/9027; G06F 40/284
See application file for complete search history.

(56) References Cited

U.S. PATENT DOCUMENTS 7,051,029 B1    5/2006  Fayyad et al.
9,734,252 B2 *  8/2017  Wolfram ............. G06F 16/3344
                        (Continued)

FOREIGN PATENT DOCUMENTS

CN      114556327 A    5/2022
GB        2594789 A   11/2021
                      (Continued)

OTHER PUBLICATIONS

Zhang J., et al., "Draft Verify: Lossless Large Language Model Acceleration via Self-Speculative Decoding", arXiv:2309.08168v2 [cs.CL] May 20, 2024, 19 Pages.
Chen C., et al., "Accelerating Large Language Model Decoding with Speculative Sampling", Deep Mind, arXiv:2302.01318v1 [cs.CL], Feb. 2, 2023, pp. 1-11.

(Continued)

*Primary Examiner* — Etienne P Leroux
(74) *Attorney, Agent, or Firm* — Patterson & Sheridan LLP

(57)    ABSTRACT

Certain aspects of the present disclosure provide techniques and apparatus for generating a response to a query input in a generative artificial intelligence model. An example method generally includes receiving a plurality of sets of tokens generated based on an input prompt and a first generative artificial intelligence model, each set of tokens in the plurality of sets of tokens corresponding to a candidate response to the input prompt; selecting, using a second generative artificial intelligence model and recursive adjustment of a target distribution associated with the received plurality of sets of tokens, a set of tokens from the plurality of sets of tokens; and outputting the selected set of tokens as a response to the input prompt.

27 Claims, 10 Drawing Sheets

Related U.S. Application Data

(60) Provisional application No. 63/460,850, filed on Apr. 20, 2023.

(56) References Cited

U.S. PATENT DOCUMENTS

| | | | | |
|---|---|---|---|---|
| 12,229,192 | B2 * | 2/2025 | Lott | G06F 16/9027 |
| 12,299,385 | B2 | 5/2025 | Tran | |
| 2009/0006392 | A1 * | 1/2009 | Chen | G06F 16/2462 |
| 2020/0142888 | A1 | 5/2020 | Alakuijala et al. | |
| 2021/0034335 | A1 | 2/2021 | Svyatkovskiy et al. | |
| 2022/0407702 | A1 * | 12/2022 | Jakobsson | H04L 9/50 |
| 2022/0414332 | A1 | 12/2022 | Lee | |
| 2024/0160902 | A1 | 5/2024 | Padgett et al. | |
| 2024/0202464 | A1 | 6/2024 | Poirier et al. | |
| 2024/0202539 | A1 | 6/2024 | Poirier et al. | |
| 2024/0256554 | A1 * | 8/2024 | Mishra | G06F 16/24575 |
| 2024/0320433 | A1 | 9/2024 | Lott et al. | |
| 2024/0354345 | A1 | 10/2024 | Lott | |
| 2024/0354346 | A1 | 10/2024 | Lott | |
| 2025/0173043 | A1 * | 5/2025 | Ma | G06T 11/00 |
| 2025/0231989 | A1 | 7/2025 | Lott et al. | |
| 2025/0245430 | A1 * | 7/2025 | Jeon | G06F 16/9027 |
| 2025/0245530 | A1 * | 7/2025 | Goel | G06N 3/0475 |
| 2025/0363173 | A1 * | 11/2025 | Viswanathan | G06F 16/9017 |
| 2026/0065048 | A1 * | 3/2026 | Lee | G06N 3/08 |
| 2026/0065119 | A1 * | 3/2026 | De Araújo | G06N 10/60 |

FOREIGN PATENT DOCUMENTS

| | | | |
|---|---|---|---|
| JP | 2021190101 | A | 12/2021 |
| WO | 2023009766 | A1 | 2/2023 |
| WO | 2024118603 | A1 | 6/2024 |

OTHER PUBLICATIONS

International Search Report and Written Opinion—PCT/US2024/017336—ISA/EPO—May 29, 2024.

International Search Report and Written Opinion—PCT/US2024/017339—ISA/EPO—Jun. 5, 2024.

Leviathan Y., et al., "Fast Inference from Transformers via Speculative Decoding", arXiv:2211.17192v1 [cs.LG], arxiv.org, Cornell University Library, 201 Olin Library Cornell University Ithaca, NY 14853, Nov. 30, 2022, 12 Pages, XP091382841, figure 1, p. 2, col. 2, paragraph 1, p. 3, col. 1, paragraph 3, Algorithm 1.

Leviathan Y., et al., "Fast Inference from Transformers via Speculative Decoding", arXiv:2211.17192v1 [cs.Lg], arxiv.org, Cornell University Library, 201 Olin Library Cornell University Ithaca, NY 14853, Nov. 30, 2022, 12 Pages, XP091382841, p. 2, col. 2, paragraph 1 figure 1 p. 3, col. 1, paragraph 3.

Stern M., et al., "Blockwise Parallel Decoding for Deep Autoregressive Models", arXiv:1811.03115v1 [cs.LG], 32nd Conference on Neural Information Processing Systems, Montreal, Canada, Nov. 7, 2018, pp. 1-10.

Xia H., et al., "Lossless Speedup of Autoregressive Translation with Generalized Aggressive Decoding", arXiv:2203.16487v4 [cs.CL], arxiv.org, Cornell University Library, 201 Olin Library Cornell University Ithaca, NY 14853, May 20, 2022, 17 Pages, XP091217988, abstract, figures 2, 3, table 14, p. 2, col. 2, paragraph 4, p. 3, col. 1, paragraph 1.

Xia H., et al., "Lossless Speedup of Autoregressive Translation with Generalized Aggressive Decoding", arXiv:2203.16487v4 [cs.CL], arxiv.org, Cornell University Library, 201 Olin Library Cornell University Ithaca, NY 14853, May 20, 2022, 17 Pages, XP091217988, figures 2, 3, table 14 section "NAT drafter", section "AT verifier", p. 4, col. 2 p. 5, col. 2, paragraph 3.

"Speculative Decoding: Lossless Speedup of Autoregressive Translation", ICLR, 2023, pp. 1-24.

* cited by examiner

400

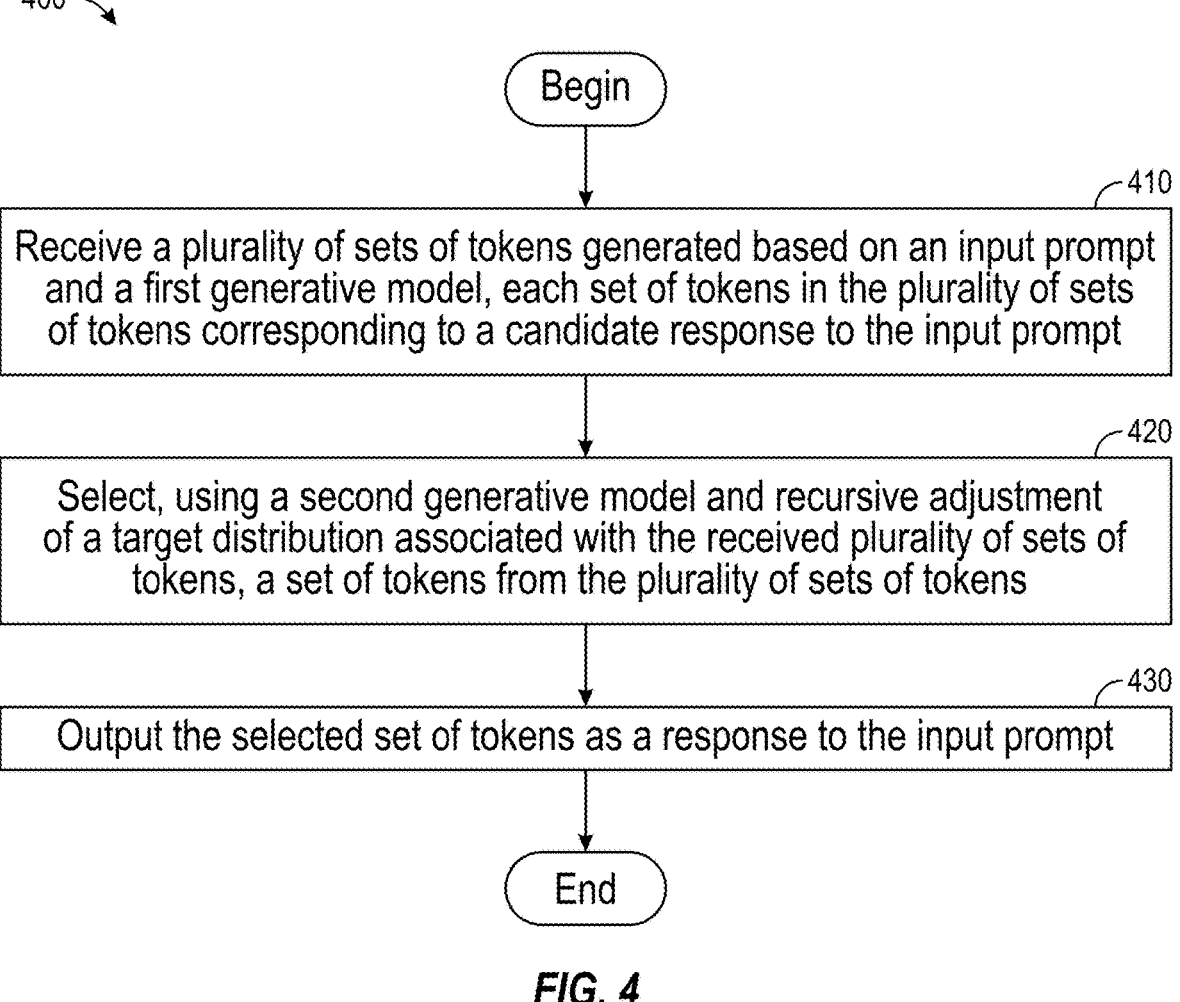

Begin

┌─ 410
Receive a plurality of sets of tokens generated based on an input prompt and a first generative model, each set of tokens in the plurality of sets of tokens corresponding to a candidate response to the input prompt ┌─ 420
Select, using a second generative model and recursive adjustment of a target distribution associated with the received plurality of sets of tokens, a set of tokens from the plurality of sets of tokens ┌─ 430
Output the selected set of tokens as a response to the input prompt End

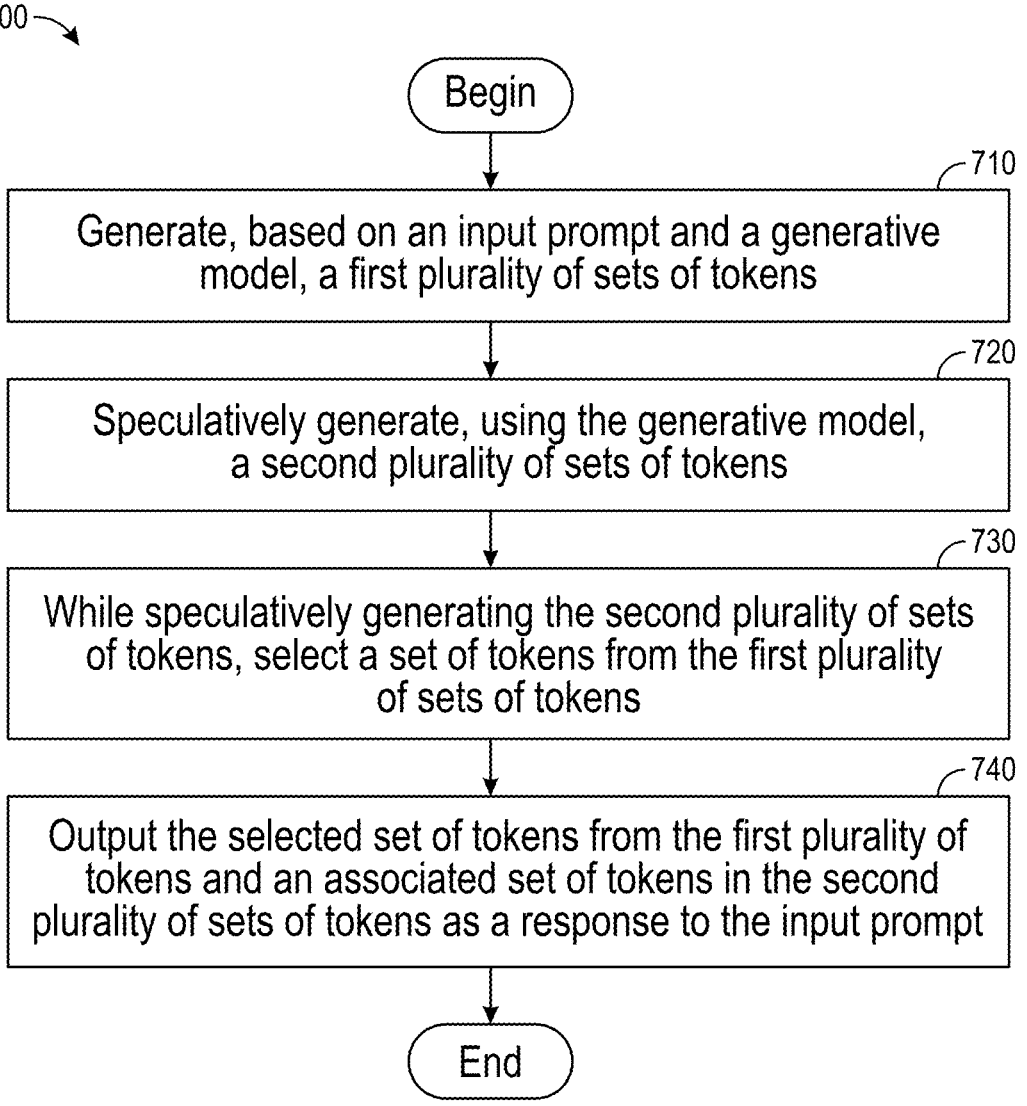

Begin

710
Generate, based on an input prompt and a generative model, a first plurality of sets of tokens 720
Speculatively generate, using the generative model, a second plurality of sets of tokens 730
While speculatively generating the second plurality of sets of tokens, select a set of tokens from the first plurality of sets of tokens 740
Output the selected set of tokens from the first plurality of tokens and an associated set of tokens in the second plurality of sets of tokens as a response to the input prompt End

902 — CPU

912 — Wireless Connectivity

904 — GPU

916 — Sensors

906 — DSP

918 — ISPs

908 — NPU

920 — Navigation

910 — Multimedia

922 — Input/Output

924 — Memory

924A — Token Set Generating Component

924C — Output Generating Component

924B — Token Selecting Component

924D — Generative Models

SPECULATIVE DECODING IN AUTOREGRESSIVE GENERATIVE ARTIFICIAL INTELLIGENCE MODELS

CROSS-REFERENCE TO RELATED APPLICATIONS

The present application is a continuation of U.S. application Ser. No. 18/538,965, filed Dec. 13, 2023, which claims benefit of and priority to U.S. Provisional Patent Application Ser. No. 63/460,850, entitled "Speculative Decoding in Autoregressive Generative Artificial Intelligence Models," filed Apr. 20, 2023, and assigned to the assignee hereof, the entire contents of both of which are hereby incorporated by reference herein.

INTRODUCTION

Aspects of the present disclosure relate to generative artificial intelligence models, and more specifically to speculative decoding in generative artificial intelligence models (also referred to herein as "generative artificial intelligence models").

Generative artificial intelligence models can be used in various environments in order to generate a response to an input prompt (also referred to as a query or an input). For example, generative artificial intelligence models can be used in chatbot applications in which large language models (LLMs) are used to generate an answer, or at least a response, to an input prompt. Other examples in which generative artificial intelligence models can be used include a latent diffusion model, in which a model generates an image from an input text description of the content of the desired image, decision transformers, in which future actions are predicted based on sequences of prior actions within a given environment, or the like.

Generally, generating a response to a query using generative artificial intelligence models may be computationally expensive. For example, in a chatbot deployment in which a large language model is used to generate a response to a query formatted as a text query, a response to the query may be generated using a pass through the large language model for each token (e.g., a word or part of a word) generated as part of the response. The output of each pass may be a probability distribution on a set of tokens (e.g., words or parts of words) from which the next token (e.g., a word or part of a word) may be selected, for example, by sampling or based on maximum likelihood. Because a pass through a large language model is used to generate each word (or token(s)) in a response to a query, the computational expense may be modeled as the product of the number of words included in the response and the computational resource expense (e.g., in terms of processing power, memory bandwidth, and/or other compute resources used) of performing a pass through the large language model, which generally increases as the number of parameters within the large language model increases.

BRIEF SUMMARY

Certain aspects of the present disclosure provide a method for generating a response to an input prompt using a generative artificial intelligence model. The method generally includes receiving a plurality of sets of tokens generated based on an input prompt and a first generative artificial intelligence model, each set of tokens in the plurality of sets of tokens corresponding to a candidate response to the input prompt; selecting, using a second generative artificial intelligence model and recursive adjustment of a target distribution associated with the received plurality of sets of tokens, a set of tokens from the plurality of sets of tokens; and outputting the selected set of tokens as a response to the input prompt.

Certain aspects of the present disclosure provide a method for generating a response to an input prompt using a generative artificial intelligence model. The method generally includes generating, based on an input prompt and a generative artificial intelligence model, a first plurality of sets of tokens, each set of tokens in the first plurality of sets of tokens corresponding to a first portion of a candidate response to the input prompt. Using the generative artificial intelligence model, a second plurality of sets of tokens are speculatively generated. Each set of tokens in the second plurality of sets of tokens generally corresponds to a second portion of the candidate response to the input prompt based on the first plurality of sets of tokens. While speculatively generating the second plurality of sets of tokens, a set of tokens from the first plurality of sets of tokens are selected, and the selected set of tokens from the first plurality of tokens and an associated set of tokens in the second plurality of tokens are output as a response to the input prompt.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict only certain aspects of this disclosure and are therefore not to be considered limiting of the scope of this disclosure.

FIG. 4 illustrates example operations for generating a response to an input prompt using recursive speculative decoding in generative artificial intelligence models, according to aspects of the present disclosure.

FIG. 7 illustrates example operations for generating a response to an input prompt using a generative artificial intelligence model and self-speculative decoding, according to aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
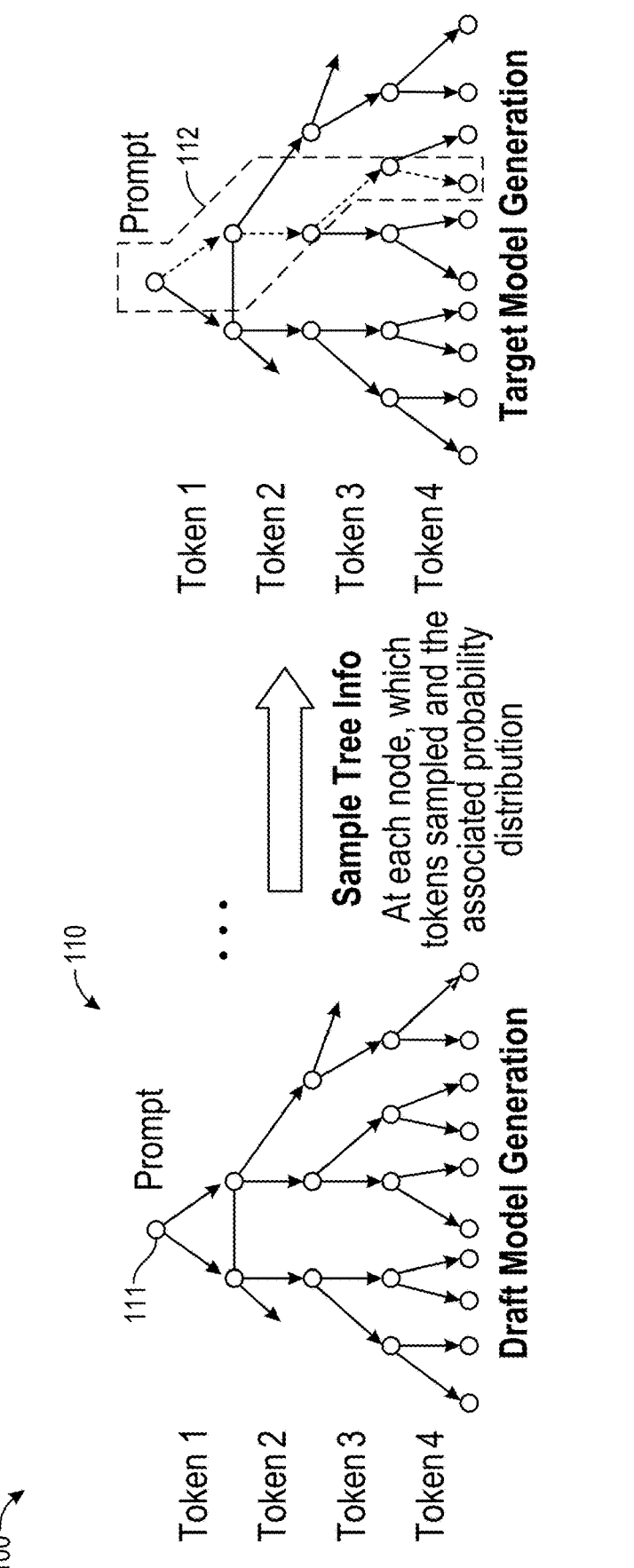
FIG. 1 illustrates an example of speculative decoding in generative artificial intelligence models, according to aspects of the present disclosure.

Aspects of the present disclosure provide apparatus, methods, processing systems, and computer-readable mediums for efficiently generating responses to input queries using generative artificial intelligence models.

Generally, generative artificial intelligence models generate a response to a query input into the model. For example, a large language model (LLM) deployed within a chatbot can generate a response to a query using multiple passes through the large language model, with each successive pass being based on the query (which may be tokenized for processing) and the tokens (or words) generated using previous passes through the large language model. Generally, these large language models may include a large number (e.g., billions, or even trillions) of weights or parameters within the model. Because of the size of these models and the operations performed on each token to predict what should be the next token generated in response to a query and the previously generated tokens, it may not be practical, or even possible, to deploy large language models on a variety of devices which have limited memory, storage, and/or processing capabilities relative to cloud compute instances on which large language models typically operate. Further, in some cases, the memory bandwidth involved in generating a response to a query provided as input into a model may prevent compute resources from being used for other tasks.

To improve the efficiency and throughput of large language models, speculative decoding techniques allow for a smaller language model, sometimes known as a draft large language model (or as a draft model or an approximation model), to execute (e.g., sequentially or in parallel) with a larger language model, sometimes known as a target large language model (or as a target model). In such a case, the draft model can generate speculatively additional tokens in sequence and probabilities used for sampling these additional tokens based on a current set of accepted tokens. The target model can generate tokens based on the tokens generated by the draft model. To generate a result, the target model can perform rejection sampling on a per-token basis to accept or reject individual tokens generated by the draft model such that the draft model and the target model have similar probability distributions.

In some aspects, the draft model may be a pruned version of the target model chosen such that the draft model and target model have similar probability distributions. In other aspects, the draft model may be a smaller version of the target model (e.g., trained on millions of tokens, instead of hundreds of millions or even billions of tokens).

Certain aspects of the present disclosure provide techniques and apparatus for generating responses to a query input into a large language model using recursive speculative decoding techniques. Generally, the draft model can generate one or more sets of tokens as candidate responses to the query, which may be structured as a plurality of branches (e.g., in a tree data structure). The target model, in turn, can perform sampling rejection recursively on tokens provided by the draft model. Generally recursive sampling rejection allows for the probability distribution used by the target model in sampling tokens generated by the draft model to be updated to remove a token rejected by the target model, and the updated probability distribution is then used to sample subsequent tokens generated by the draft model. By performing rejection sampling recursively, certain aspects of the present disclosure may retain a close relationship between the probability distributions within the draft and target models, while increasing the throughput of the draft and target models (e.g., the number of tokens generated per second) relative to draft and target models configured to generate responses on a per-token basis.

Other aspects of the present disclosure provide techniques and apparatus for generating responses to a query input into a large language model using speculative decoding techniques in which a single model speculatively generates tokens in response to the query input and verifies previously generated tokens, also referred to herein as "self-speculative decoding." In self-speculative decoding techniques, a model can speculatively generate one or more tokens and speculatively generate additional tokens based on varying numbers of speculatively generated tokens that are verified by the model. By using the same model to speculatively generate tokens in response to a query and to perform verification of (e.g., rejection sampling on) the speculatively generated token, aspects of the present disclosure can reduce the computational expenditure involved in training and using generative artificial intelligence models relative to the use of multiple separately trained models for speculatively generating tokens and performing verification of the speculatively generated tokens. Further, the rate at which tokens are generated may be maximized, or at least increased, with self-speculative decoding as compared to other speculative decoding techniques.

Speculative Decoding in Generative Artificial Intelligence Models

Generally, autoregressive token generation (e.g., in large language models) may take historical tokens as an input in order to generate an output. That is, autoregressive token generation may be represented by the expression:

$$x_t \sim p(x \mid x_0, x_1, ..., x_{t-1}) \rightarrow x_{t+1} \sim p(x \mid x_0, x_1, ..., x_{t-1}, x_t)$$

where $x_t$ represents a sequence of tokens generated at time t, having a conditional probability p conditioned on the selection of tokens $x_0$ through $x_{t-1}$, and $x_{t+1}$ represents a sequence of tokens generated at time t+1, having a conditional probability p conditioned on the selection of tokens $x_0$ through $x_t$. Generally, a single token may be generated each time an autoregressive model is executed, which means that N inferences may be performed to generate a sequence of N tokens. As discussed above, speculative decoding techniques can be used to accelerate token generation by using a draft model, smaller in size than the target model, that speculatively generates tokens faster than the target model, with the target model being used to verify the tokens (speculatively) generated by the draft model.

In a speculative decoding pipeline, the draft model may speculatively generate n tokens autoregressively, according to the expression:

$$x_{t+1}^{draft} \sim p_t^{draft} = p^{draft}(x \mid x_0, \ldots x_t), x_{t+2}^{draft} \sim p_{t+1}^{draft}, \ldots, x_{t+n}^{draft} \sim p_{t+n-1}^{draft}$$

where t corresponds to a point in time, $$p_t^{draft}$$

corresponds to the conditional probability distribution associated with a selected token x at time t conditioned on the selection of tokens $x_0$ through $x_{t-1}$, and $$x_t^{draft}$$

represents a token x speculatively generated at time t by the draft model.

The target model takes the generated n tokens and processes the n tokens in parallel to generate probability distributions for each of the n tokens, according to the expression:

$$\left[ p_t^{target}, p_{t+1}^{target}, \ldots, p_{t+n}^{target} \right] = \left[ p^{target}\left(x \mid x_0, \ldots x_t, x_{t+1}^{draft}, \ldots, x_{t+k}^{draft}\right) \right]_{k=1,2,\ldots,n}$$

where k corresponds to a token index relative to the generated n tokens and $$p_t^{target}$$

corresponds to a probability distribution generated by the target model at time t for the tokens x generated by the draft model.

The target model can then verify the tokens generated by the draft model by comparing distributions from the draft model and target model to determine whether a token is accepted or rejected. A given token $$x_{t+k}^{draft}$$

may be accepted when $$f\left(p_k^{draft}, p_k^{target}\right) < \alpha,$$

for some function $f$ and some threshold $\alpha$ (also known as an acceptance rate). Otherwise, the token may be rejected. The final token may then be generated at the first rejection position or at the last position n based on some function $$g\left(p_k^{draft}, p_k^{target}\right).$$

Speculative decoding, with an acceptance rate of $\alpha$, may result in cost reductions relative to using a single autoregressive model to generate tokens iteratively. Inference cost savings, relative to iterative token generation, may be represented by the expression:

$$C^{AR} = NC^{target} \rightarrow C^{SD} = nNC^{draft} + \frac{N}{\alpha + 1} C^{target}$$

where N corresponds to a number of tokens, $C^{AR}$ corresponds to a computational cost using an acceptance rate of $\alpha$, $C^{target}$ corresponds to a computational cost of generating a set of tokens using the target model, $C^{draft}$ corresponds to a computational cost of generating a set of tokens using the draft model, $C^{SD}$ corresponds to a computational cost of speculatively generating a set of tokens using the draft model, and n corresponds to a number of tokens generated speculatively in a single pass through an autoregressive model. Consider an example in which N=1000, $C^{target}$=10, $C^{draft}$=1, n=4, and $\alpha$=3. In such an example, speculative decoding may result in a 35% reduction in computational expense relative to autoregressive iterative token generation alone.

However, speculative decoding on a per-token basis, as discussed, may impose limits on the rate at which tokens are generated, as a first token may be sampled individually by a draft model and then verified by a target model before the next token is sampled by the draft model and verified by the target model. That is, generating a response to an input prompt using per-token speculative decoding techniques may involve executing the draft model and target model for each token generated as part of a response to the input prompt, which may use significant amounts of computational resources (e.g., processor time, memory, memory bandwidth, etc.) in order to generate the response.

Example Recursive Speculative Decoding in Generative Artificial Intelligence Models FIG. 1 illustrates an example 100 of recursive speculative decoding in generative artificial intelligence models, according to aspects of the present disclosure.

As illustrated, a draft model and a target model can be used in conjunction (or otherwise together) to perform recursive speculative decoding of tokens to generate a response to a query received for processing by one or more generative artificial intelligence models. As discussed in further detail below, recursive speculative decoding of tokens may allow for multiple sets of tokens (or sequences of tokens) to be speculatively generated by a draft model for verification by a target model. Because multiple sets (or sequences) of tokens may be generated by a draft model for verification by a target model, recursive speculative decoding may increase the token generation rate of generative artificial intelligence models by generating multiple sets (sequences) of tokens that can be accepted as a correct response, as larger numbers of sets of tokens may increase the probability that at least one set includes a sequence of one or more tokens that will be accepted as a response.

The draft model generally selects a plurality of high probability nodes (tokens) from a probability distribution for an output over a set of potential tokens, given an input of the received query. The high probability nodes (tokens) may be selected based on various techniques, such as top-k selection (e.g., selection of the k tokens having the highest probabilities within a probability distribution), nucleus-based selection (e.g., selection based on a sum of probabilities meeting a threshold probability), or the like. By choosing many candidate tokens, the draft model can sample tokens based on the probability distribution and organize a tree structure that may be recursively traversed, as discussed in further detail below, in order to identify a set of tokens that are a suitable output for the given input.

When a sampled group of tokens is input into the draft model in the next iteration of executing the draft model, the tokens in the sampled group of tokens are input at the sample location and treated independently. The result may be a tree data structure 110, with a prompt as a root node 111 of the tree data structure, and subsequent levels within the tree data structure 110 representing different tokens (or groups of tokens), combined with each of the previously selected token combinations. At some point in time (e.g., after generating a tree with a defined depth, corresponding to a maximum length of a sequence generated by the draft model), the draft model may output the generated tree data structure 110 to the target model for further processing. The tree data structure 110 may, in some aspects, be output to the target model with groupings and selection probabilities generated by the draft model.

In some aspects, the draft model may be configured to trigger generation of tokens by the target model (and subsequent speculative decoding) based on various criteria. These criteria may include a complexity criterion or performance criterion, such as a complexity or performance criterion associated with the size of the generated tree data structure 110. In some aspects, these criteria may include a time criterion associated with an expected amount of time for the target model to generate a set of tokens against which the generated tree data structure 110 can be compared. Generally, these complexity and/or performance criteria may set an upper bound on the number of tokens generated by the draft model for verification by the target model. This upper bound may, in some aspects, be based on a number of nodes in the tree data structure and may be influenced, for example, by a branching factor defined for different levels of the tree data structure 110 into which sampled tokens are organized, a depth of the tree data structure 110, or the like. The worst-case computational load at the last round of speculative token generation may be configured to be bound by memory bandwidth at the device on which the draft model executes.

In some aspects, the number of nodes at each level of the tree data structure 110 (e.g., where token n illustrated in FIG. 1 corresponds to the $n^{th}$ level in the tree data structure 110, and where level 0 corresponds to the root node 111 in the tree data structure 110) and the depth of the tree data structure 110 may be defined a priori. The number of nodes at each level of the tree may be defined globally, on a per-level basis, or in some other manner. For instance, the number of nodes at any level of the tree data structure 110 may be defined based on a branching factor at the immediate prior level of the tree data structure 110. For example, a branching factor of 2 for nodes at the $n^{th}$ level of the tree data structure 110 may result in the generation of 2 nodes (tokens) at the $n+1^{th}$ level of the tree data structure 110 for each node (token) at the $n^{th}$ level of the tree. Meanwhile, the depth of the tree data structure 110 may be defined based on a maximum number of tokens (e.g., words) that can be generated using any pass through the draft model. For example, if the draft model is configured to generate a sequence with a maximum length of 5 tokens during any instance of speculative generation, then the depth of the tree may be 6 (to include, at the first level of the tree data structure 110, the root node 111 corresponding to the input into the draft model).

The target model recursively performs rejection sampling on (1) the tokens generated by the draft model and included in the generated tree data structure 110 and (2) a probability distribution q provided as input to the target model. Rejection sampling may be performed recursively at each node in the generated tree, where a terminating condition of token selection by the target model at a given layer of the tree data structure 110 is modeled as a recursion problem in which a terminating condition of the recursion problem is either acceptance of a token or rejection of all tokens. In recursively performing rejection sampling, the target model can accept or reject a token and adjust the probability distribution used to verify a subsequent token in the generated tree. If a token is rejected, an updated probability distribution $q'=(q-p)$ may be generated for use in evaluating subsequent tokens in the tree, where p represents the probability associated with the rejected token from the original probability distribution q. Subsequently, the updated probability distribution q' may be used to evaluate the next token in the tree. The resulting selected set of tokens 112 may be identified recursively, by traversing from the root node 111 of the generated tree data structure 110 based on the updated probability distributions generated for each node in the generated tree data structure, as discussed in further detail below.

In one example, recursive rejection sampling may be performed using "greedy" techniques, in which the first token that is accepted is returned as a valid portion of a response to the input query (or prompt). In another example, recursive rejection sampling may be performed to determine whether to accept each token at a given level in the tree data structure 110. The selected token at that given level in the tree data structure 110 may be, for example, the token having the highest probability of being a valid token for inclusion in a response to the input prompt. In still another example, a cumulative probability distribution may be generated for each accepted sequence of tokens from the generated tree data structure, and the sequence with the largest cumulative probability distribution may be selected as the response to the input prompt. It should be recognized, of course, that these are but examples of techniques based on which sequences of tokens may be selected from the tree data structure 110, and other techniques for selecting sequences of tokens based on recursive rejection sampling (and corresponding adjustment of the probability distribution q when tokens are rejected) may be contemplated.

In some aspects, the draft model may match the probability distribution of the target model but may have faster inference performance than the target model on the same hardware. Generally, smaller models can generate many speculative tokens, but may have an increased likelihood of generated tokens being rejected by the target model. The speculative decoding techniques discussed herein may address this increased likelihood of token rejection, at the expense of increasing computational expense for longer sequences. Finally, at the draft model, a temperature parameter (generally used herein to refer to a parameter influencing the likelihood of the draft model selecting a token (word) with a lower likelihood) may be tuned to improve the performance of recursive speculative decoding. In some aspects, the draft model may be fine-tuned to match, or at least approximate, the probability distribution of the target model and maximize, or at least increase, the probability that speculatively generated tokens (or sequences of tokens) generated by the draft model will be accepted as valid tokens by the target model.

Generally, token generation performance for recursive speculative decoding may be increased relative to speculative decoding on a per-token basis. That is, for any given Kullback-Leibler (KL) divergence between the draft model and target model, the number of tokens generated for each target model run may be larger for recursive speculative decoding than for per-token speculative decoding. The KL divergence generally measures how the probability distribution of the draft model differs from the probability distribution of the target model (treating the target model as the reference distribution). Different selection strategies (e.g., group size, additional tokens, etc.) may have different computational complexity characteristics. Accordingly, the selection of a strategy for selecting tokens for acceptance of rejection using recursive speculative decoding may be based on a tradeoff between computational complexity and performance, given bounding parameters of read bandwidth for the draft and target models and hardware performance.

Figure 2A:
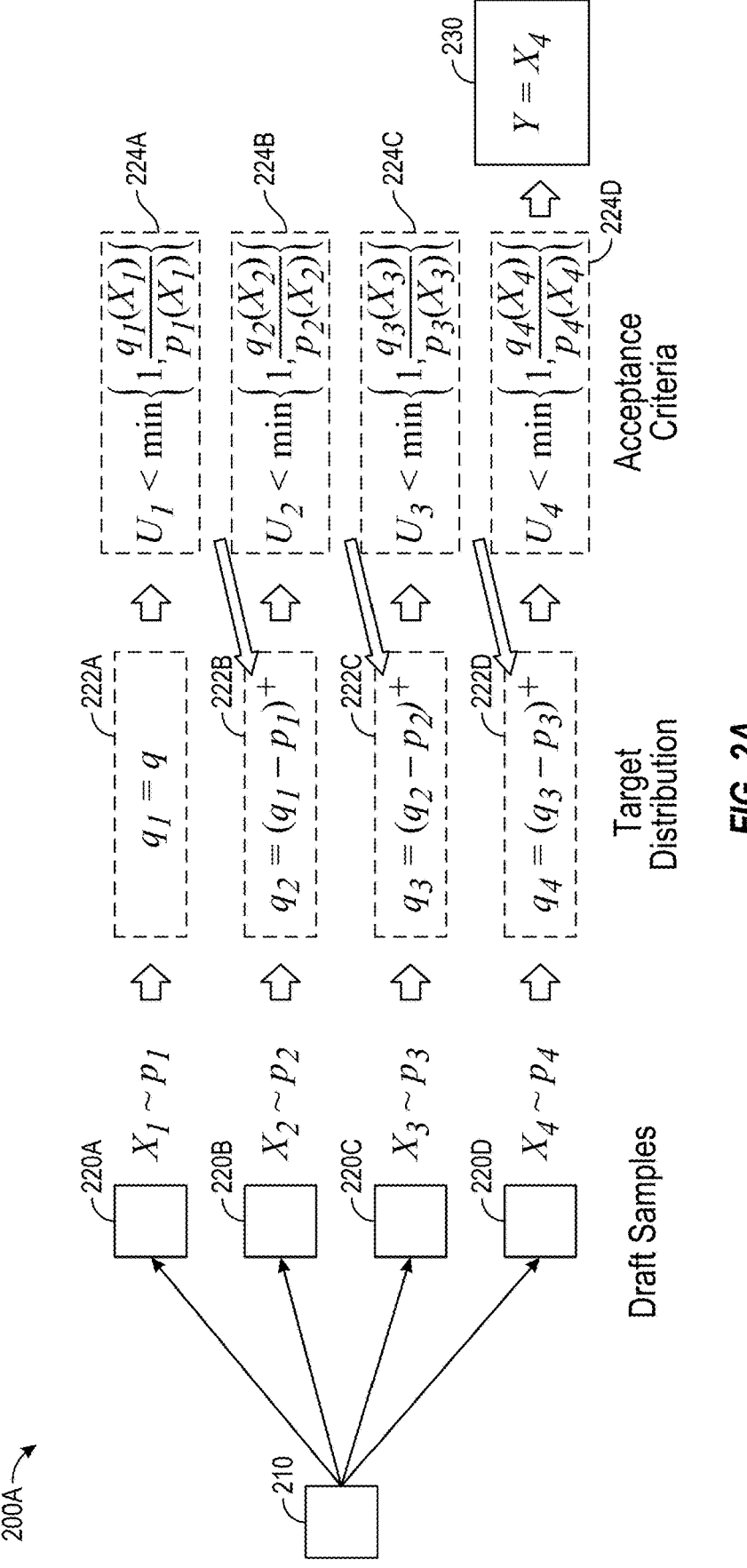
FIGS. 2A and 2B illustrate examples of recursive speculative decoding in generative artificial intelligence models, according to aspects of the present disclosure.
Figure 2B:
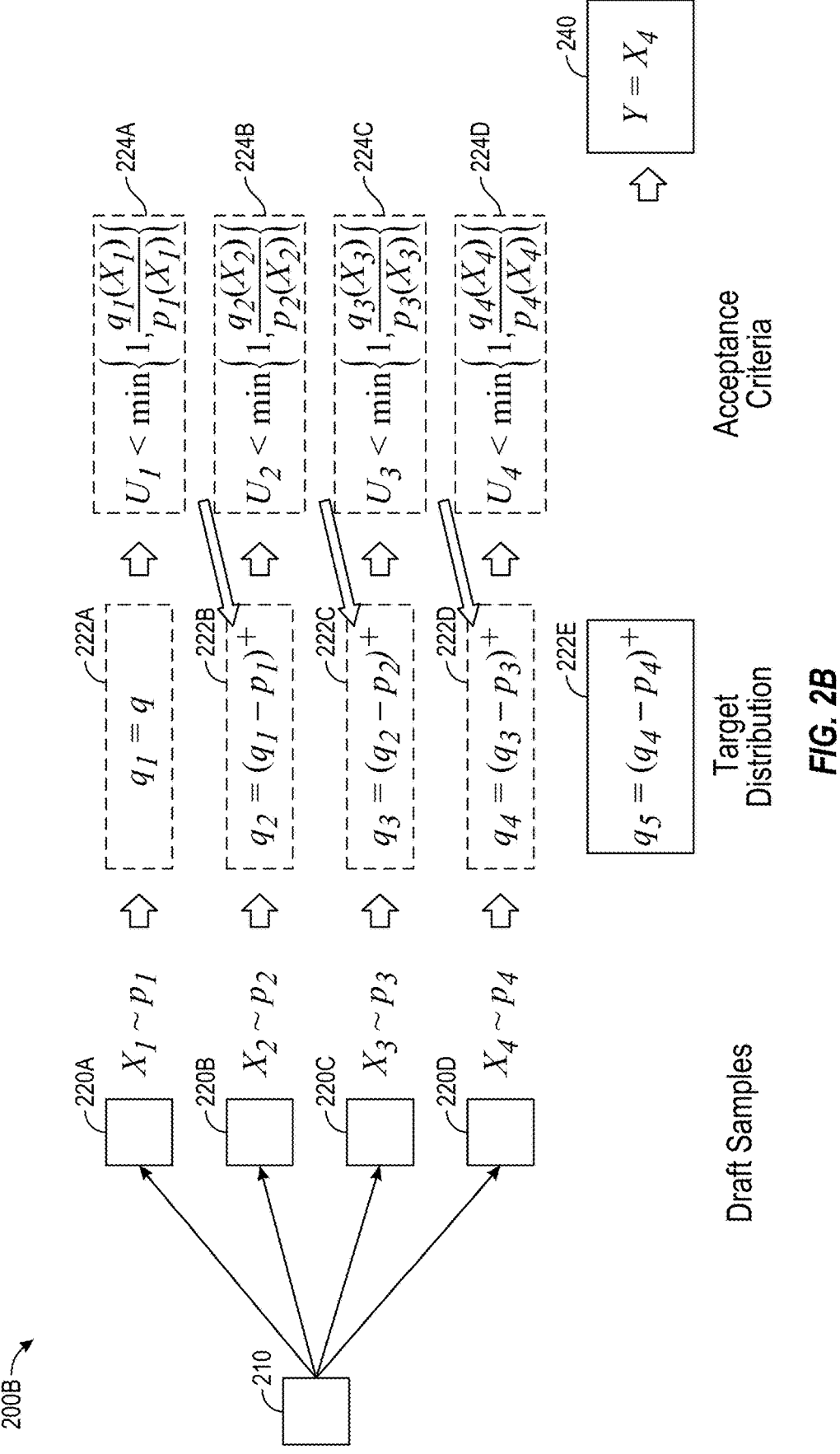

FIGS. 2A and 2B illustrate examples 200A, 200B of recursive speculative decoding in generative artificial intelligence models, according to aspects of the present disclosure.

The example 200A illustrated in FIG. 2A depicts an example in which one of multiple tokens generated by a draft model is accepted for inclusion in a response to a prompt 210. As illustrated, the draft model generates four proposed tokens $X_1$ 220A, $X_2$ 220B, $X_3$ 220C, and $X_4$ 220D, with associated probabilities $p_1$, $p_2$, $p_3$, $p_4$ from an original target distribution q. A target model can sequentially examine these tokens to determine whether to accept or reject each token. As illustrated, the target model first examines token $X_1$ 220A to determine whether the token 220A should be accepted or rejected as a token to be returned as part of a response to a given input (e.g., the prompt 210). In this example, the target distribution $q_1$ 222A may be set to the original target distribution q, and the target model can determine whether to accept or reject the token $X_1$ 220A based on selection criteria 224A:

$$U_1 < \min\left\{1, \frac{q_1(X_1)}{p_1(X_1)}\right\}$$

where $U_1$ represents a generated random number between [0, 1].

If the token $X_1$ 220A is accepted (not shown), then the token $X_1$ 220A may be output, and the target model analysis of the proposed tokens generated by the draft model may proceed to traverse the tree to analyze nodes (tokens) connected to the node represented by token $X_1$ 220A in the generated tree.

Otherwise, if, as illustrated, the token $X_1$ 220A is rejected, then the target model can proceed to determine whether the token $X_2$ 220B should be accepted or rejected. In doing so, the target model can use a new target distribution $q_2$ 222B, which may be the result of subtracting the probability $p_1$ associated with rejected token $X_1$ 220A from the target distribution $q_1$ 222A, such that $q_2=(q_1-p_1)^+$. The target model can then determine whether to accept or reject the token $X_2$ 220B based on selection criteria 224B:

$$U_2 < \min\left\{1, \frac{q_2(X_2)}{p_2(X_2)}\right\}$$

where $U_2$ also represents a generated random number between [0, 1].

As with the token $X_1$ 220A discussed above, the target model can determine that the token $X_2$ 220B satisfies the acceptance criteria and thus return the token $X_2$ 220B as the selected token (not shown). Otherwise, if, as illustrated, the token $X_2$ 220B is rejected, then the target model proceeds to determine whether the token $X_3$ 220C should be accepted or rejected, using an updated target distribution $q_3$ 222C that removes $p_2$ from $q_2$ (e.g., such that $q_3=(q_2-p_2)^+$) and acceptance criteria $U_3$ 224C. This process may continue until, as illustrated, it is determined that a token (in this example, the token $X_4$ 220D illustrated in example 200A using an updated target distribution $q_4$ 222D) is accepted (e.g., based on acceptance criteria $U_4$ 224D) and output as the selected token Y 230.

The example 200B illustrated in FIG. 2B illustrates an example in which the target model rejects each of the tokens 220A-220D generated by the draft model. In this example, the target model can generate a final target distribution 222E, sample a token from this final target distribution 222E, and terminate traversal of the generated tree. As illustrated, the final target distribution $q_5$ 222E may be the result of subtracting the probability associated with the final token in the set of generated tokens (e.g., the probability $p_4$ associated with the token $X_4$ 220D). The final target distribution $q_5$ 222E may be represented by the equation $q_5=(q_4-p_4)^+$. A token 240 sampled from the final target distribution $q_5$ 222E may be returned as the output Y of performing recursive rejection sampling on the generated tokens.

Figure 3:
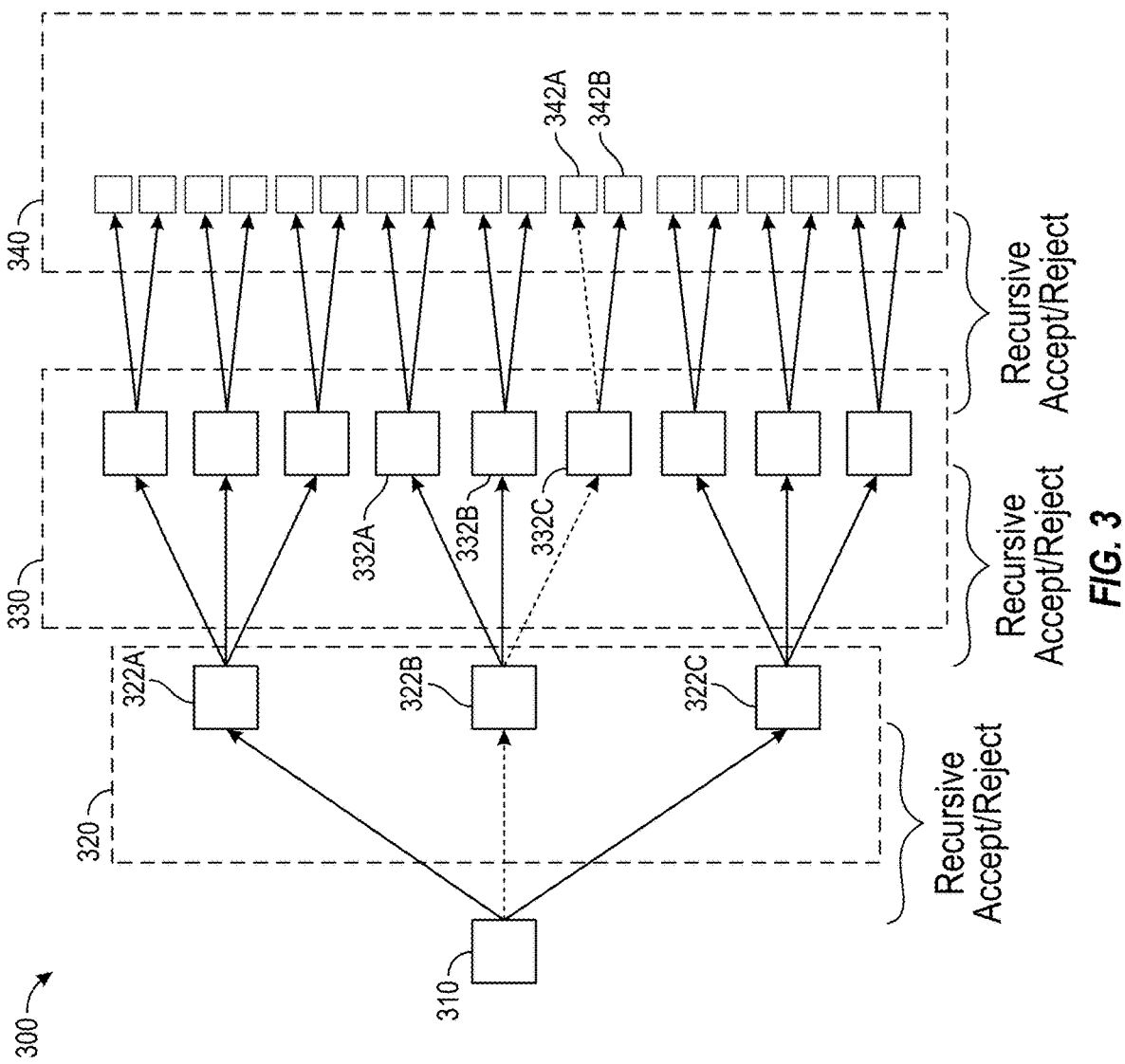
FIG. 3 illustrates an example tree of tokens generated using recursive speculative decoding in generative artificial intelligence models, according to aspects of the present disclosure.

FIG. 3 illustrates an example tree data structure 300 of tokens generated using recursive speculative decoding in generative artificial intelligence models, according to aspects of the present disclosure.

As illustrated, the tree data structure 300 includes a plurality of levels, starting from a root node 310 representing the input (which may be tokenized) into a generative artificial intelligence model and tokens previously generated by the draft model and accepted by the target model using recursive rejection sampling, as discussed above. Each level 320, 330, and 340 (and/or others not illustrated in FIG. 3) in the tree data structure 300 may be the result of speculatively generating a number of tokens by the draft model, given some previous set of generated tokens. The number of tokens generated in level n+1 of the tree data structure 300 for a node at level n of the tree data structure 300 may be determined based on a branching factor defined for nodes at level n of the tree data structure 300. As discussed, the branching factor may be the same across all levels of the tree data structure 300, or the branching factor may be defined for each level of the tree data structure 300. In some aspects, the branching factor may be defined with a larger number of branches generated for nodes at lower levels of the tree data structure 300 and with a smaller number of branches for nodes at higher levels of the tree data structure 300, or vice versa.

To traverse the tree data structure 300 and select a set of tokens from groups of speculatively generated tokens, the target model can recursively accept or reject tokens starting from the first set of tokens generated by the draft model at the first level 320 of the tree data structure 300 (e.g., tokens represented by nodes that are the immediate children nodes of the root node 310). Generally, in traversing the tree, the target model can determine whether a token should be accepted or rejected and adjust the target distribution based on determining whether the token should be accepted or rejected. At the first level 320 of the tree data structure 300, if a first token is rejected, then the target model can remove the first token from the target distribution (as discussed above with respect to FIG. 2) and proceed to determine whether a second token at the first level of the tree should be accepted or rejected based on an updated target distribution. In rejecting the first token at the first level 320 of the tree data structure 300, the target model need not analyze tokens represented by nodes that are, directly or indirectly, child nodes of the node in the tree data structure 300 representing the rejected first token.

Generally, in traversing the tree data structure 300, the target distribution may be recursively modified until a terminating condition is reached. A terminating condition may be, for example, identification of a sequence of tokens which are accepted as acceptable response outputs for the input (represented by the root node 310 of the tree data structure 300), plus an additional node sampled from the modified target distribution after the sequence of tokens has been accepted by the target model. In another example, a terminating condition may be a determination that no sequence of tokens speculatively generated by the draft model have been accepted by the target model. In such a case, as discussed above with respect to FIG. 2B, an additional token sampled from the final target distribution may be output as a response to the input corresponding to the root node 310 in the tree data structure 300. The target distribution, as discussed above, may be a target distribution generated by removing probabilities associated with the generated tokens from the original target distribution generated by the draft model.

In the example illustrated in FIG. 3, at the first level 320 of the tree data structure 300, a first token 322A may be rejected. Because the first token 322A is rejected as one of the candidate tokens for inclusion in a response to the input corresponding to the root node 310, tokens in the tree data structure 300 that are children tokens to the first token 322A need not be examined for selection as candidate tokens. Thus, the immediate children tokens to the first token 322A in the second level 330 of the tree data structure 300 and the grandchildren tokens to the first token 322A in the third level 340 of the tree data structure 300 may be discarded or ignored.

In rejecting the first token 322A from the set of candidate tokens in the first level 320 of the tree data structure 300, as discussed, the target probability distribution associated with the tokens in the first level 320 of the tree data structure 300 may be modified to remove the probability value associated with the first token 322A. The updated target distribution may be subsequently used in examining a second token 322B in the first level 320 of the tree data structure 300. As illustrated, the second token 322B may be accepted as a candidate token for inclusion in a response to the input corresponding to the root node 310, and an analysis may proceed to the children tokens (e.g., 332A, 332B, and 332C) of the second token 322B in the second level 330 of the tree data structure 300.

As illustrated, the tokens 332A and 332B may be rejected by the target model. In rejecting the tokens 332A and 332B, the target probability distribution used to accept or reject tokens in the second level 330 of the tree data structure 300 may be adjusted to remove the probabilities associated with the tokens 332A and 332B. This adjusted target probability distribution may then be used to determine whether to accept or reject the token 332C in the second level 330 of the tree data structure 300. As illustrated, the target model can accept the token 332C, and an analysis may proceed to the children tokens (e.g., 342A, 342B) of the token 332C in the third level 340 of the tree data structure 300. At the third level 340 of the tree data structure 300, the target model can examine tokens 342A and 342B using the techniques discussed above and can accept the token 342A as a candidate for inclusion in a response to the input corresponding to the root node 310.

In some aspects, acceptance of the second token 322B as a candidate token for inclusion in a response to the input corresponding to the root node 310 may not preclude analysis of the third token 322C for inclusion or rejection as a candidate token for inclusion in a response to the input corresponding to the root node 310. In such a case, acceptance or rejection of the child tokens in the levels 320 and 330 of the tree data structure 300 (amongst others, not illustrated in FIG. 3) may be performed as discussed above with respect to the acceptance or rejection of children tokens of the second token 322B above. In some aspects, such as when the probability of the second token 322B being a candidate token for a response to the input corresponding to the root node 310 exceeds a threshold value, the third token 322C may be deemed to have been rejected, and an analysis of the child tokens of the third token 322C may be bypassed.

The recursive speculative decoding techniques discussed herein may lead to significant gains in token generation performance relative to per-token generation and acceptance. Generally, recursive speculative decoding techniques may allow for increases in token acceptance performance (e.g., the number of tokens that are accepted for a given draft length) for each time the target model is executed relative to per-token speculative decoding techniques. The amount by which performance increases may expand as the number of branches generated for any token increases and as the draft length increases. Further, the recursive speculative decoding techniques discussed herein may provide for increased rates (over time) at which tokens are generated relative to per-token speculative decoding techniques.

Example Operations for Recursive Speculative Decoding in Generative Artificial Intelligence Models FIG. 4 illustrates example operations 400 that may be performed by a computing device to generate a response to an input prompt using generative artificial intelligence models (e.g., as discussed herein with respect to FIGS. 1 through 3), according to aspects of the present disclosure. The operations 400 may be performed by a computing device on which at least a target model can be deployed, such as a laptop computer, a desktop computer, a server, a cloud compute instance hosted in a distributed computing environment, or the like.

As illustrated, the operations 400 begin at block 410, with receiving a plurality of sets of tokens. Generally, the plurality of sets of tokens may be tokens generated (e.g., by a draft model deployed at a client device from which the plurality of sets of tokens are received) based on an input prompt and a first generative artificial intelligence model. The input prompt may be received at the client device, for example, from a user via a text entry prompt, audio capture prompts, or other techniques by which an input may be provided to the client device. Generally, each set of tokens in the plurality of sets of tokens may correspond to a candidate answer to the input prompt.

In some aspects, the plurality of sets of tokens may be organized into a tree data structure (e.g., the tree data structure 110 illustrated in FIG. 1 or the tree data structure 300 illustrated in FIG. 3). The tree data structure may have a root node and one or more leaf nodes. The input prompt may correspond to the root node of the tree data structure.

Each path through the tree data structure may correspond to a different candidate response to the input prompt. It should be understood that a path through the tree data structure need not terminate at a node in the tree data structure having no leaf nodes; that is, a candidate response may correspond to a path that partially traverses the tree data structure (e.g., to reflect rejected tokens in a response).

In some aspects, the number of tokens at any given level of the tree data structure may be based on a branching factor associated with an immediately prior level to the level in the tree data structure. The tree data structure may have different branching factors assigned to different levels in the tree data structure. Generally, higher branching factors may allow for the generation of a larger number of tokens at any given level of the tree data structure and generally increase the total number of tokens included in the tree data structure. Meanwhile, lower branching factors may restrict the generation of tokens at any given level of the tree data structure and generally decreases the total number of tokens included in the tree data structure.

In some aspects, the size of each set of tokens may be based on a computational complexity metric associated with generating a target set of tokens by the second generative artificial intelligence model.

At block 420, the operations 400 proceed with selecting, using a second generative artificial intelligence model and recursive adjustment of a probability distribution, a set of tokens from the plurality of sets of tokens.

In some aspects, the recursive adjustment of the probability distribution includes rejecting a token from the plurality of sets of tokens as a candidate for inclusion as an answer to an input prompt. Generally, a token may be rejected if some defined acceptance criteria, which may be based on a target distribution and a probability associated with the token in the original target distribution, is not satisfied. The current distribution used by the target model to determine whether a token should be accepted or rejected may be modified by removing (or subtracting) the probability associated with the token in the original target distribution from the current distribution, resulting in the generation of an updated target distribution that can be used to determine whether the next token should be accepted or rejected as a candidate for inclusion as an answer to the input prompt.

In some aspects, selecting the set of tokens from the plurality of sets of tokens may include rejecting a first token at a first level of a tree data structure representing the plurality of sets of tokens. An adjusted probability distribution may be generated based on the rejection of the first token. Within the tree data structure, children tokens of the first token at levels deeper than the first level of the tree data structure may be discarded. A second token at the first level of the tree data structure may be accepted or rejected based on the adjusted probability distribution.

In some aspects, selecting the set of tokens from the plurality of sets of tokens may include rejecting each set of tokens generated by the first generative artificial intelligence model. A token may be sampled, using the second generative artificial intelligence model, based on a target distribution that excludes probabilities associated with each set of tokens generated by the first generative artificial intelligence model.

At block 430, the operations 400 proceed with outputting the selected set of tokens as a response to the input prompt.

In some aspects, the first generative artificial intelligence model may correspond to a draft model in a speculative decoding pipeline, and the second generative artificial intelligence model may correspond to a target model in the speculative decoding pipeline. The first generative artificial intelligence model may execute on a client device, and the second generative artificial intelligence model may execute on a remote system from the client device, such as a server computer, a cloud computing instance, or the like. In some aspects, the first generative artificial intelligence model and the second generative artificial intelligence model may execute on the same device.

In some aspects, the first generative artificial intelligence model and the second generative artificial intelligence model may have equivalent probability distributions.

In some aspects, the first generative artificial intelligence model may have a probability distribution that approximates a probability distribution associated with the second generative artificial intelligence model.

Example Self-Speculative Decoding in Generative Artificial Intelligence Models In some aspects, various types of speculative decoding, including group speculative decoding and recursive speculative decoding, may be achieved using a single generative artificial intelligence model that combines the functionality of the draft model and the target model discussed above. In doing so, draft token generation, target token generation, and token acceptance may be parallelized in a single generative artificial intelligence model. Using a single generative artificial intelligence model may, for example, reduce the computational expense involved in generating both a target model and a draft model, increase the performance of generative tasks by executing token verification and speculative generation in one pass through the single generative artificial intelligence model, reduce the amount of memory used in storing models used for speculative decoding in generative tasks, and so on.

Figure 5:
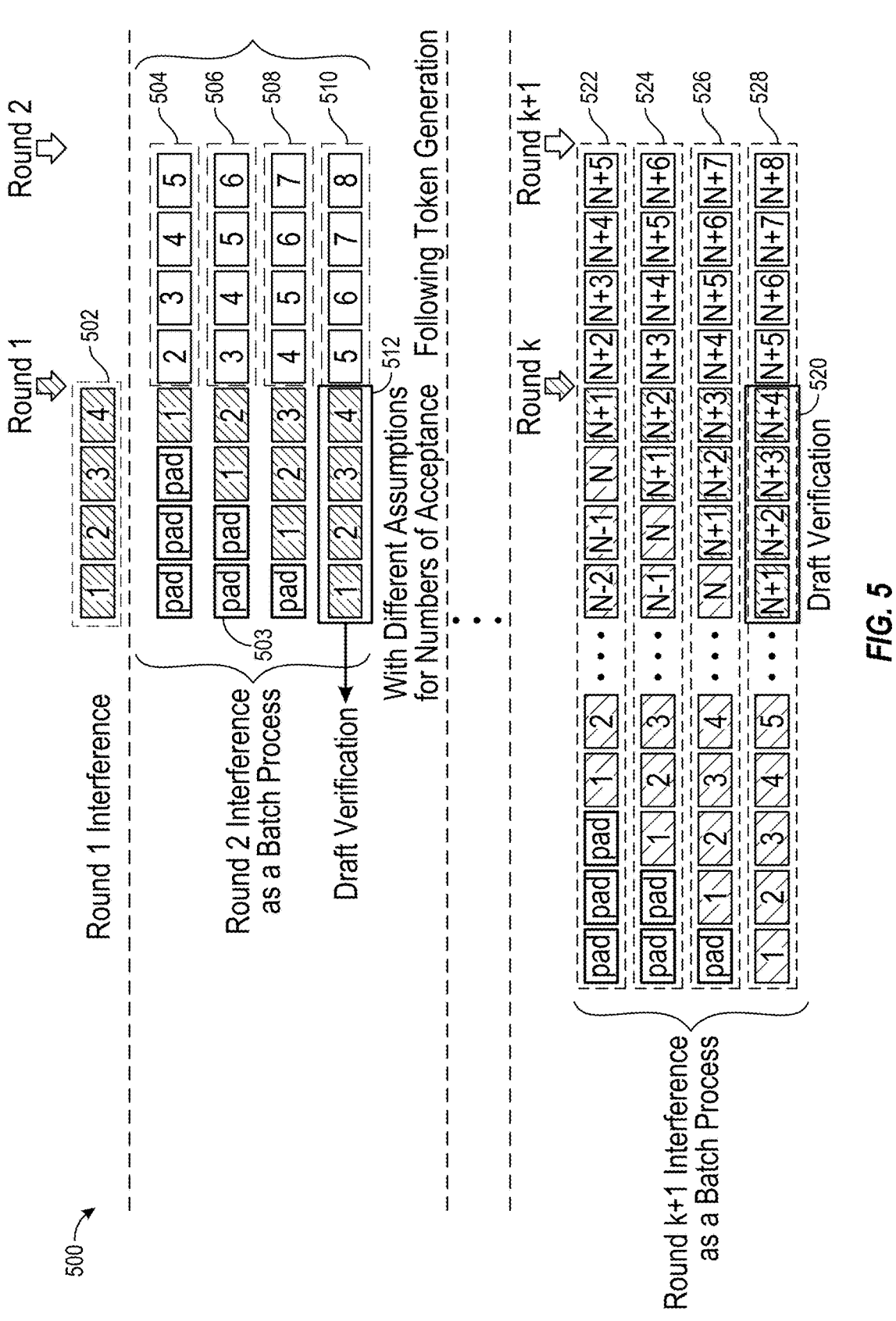
FIG. 5 illustrates an example pipeline for self-speculative decoding in generative artificial intelligence models, according to aspects of the present disclosure.

FIG. 5 illustrates an example pipeline 500 for self-speculative decoding in generative artificial intelligence models, according to aspects of the present disclosure. In some aspects, the pipeline 500 may be used to generate and analyze a tree data structure of tokens associated with a candidate response to a query input into a generative intelligence model, such as the tree data structure 300 illustrated in FIG. 3 or the like.

As illustrated, the pipeline 500 uses a single generative artificial intelligence model to speculatively generate tokens and verify the speculatively generated tokens. During a first inference round in the pipeline 500, a first set of tokens 502 is speculatively generated. As illustrated, for example, the first set of tokens 502 may include tokens 1 through 4 and may be provided as input during a second round in the pipeline 500 to speculatively generate the next set of tokens as a batch process in which multiple sets of tokens are generated. While the first set of speculatively generated tokens is processed by the single generative artificial intelligence model, the single generative artificial intelligence model continues to speculatively generate a plurality of second sets of draft tokens 504, 506, 508, and 510 in a second inference round in the pipeline 500.

In generating the second sets of draft tokens 504, 506, 508, and 510, assumptions may be made for different numbers of accepted tokens from the first set of tokens 502. For example, as illustrated, the second set of draft tokens 504 may assume acceptance of the first draft token from the first set of tokens 502 and may include a speculatively generated set of tokens based on acceptance of the first token. The second set of draft tokens 506 may assume acceptance of the first and second draft tokens from the first set of tokens 502 and include a speculatively generated set of tokens based on acceptance of the first and second tokens. The second set of draft tokens 508 may assume acceptance of the first through third draft tokens from the first set of tokens 502 and include a speculatively generated set of tokens based on acceptance of the first through third tokens. Finally, the second set of draft tokens 510 may assume acceptance of all four tokens from the first set of tokens 502 and include a speculatively generated set of tokens based on acceptance of all four tokens. In various aspects, for the cases in which fewer tokens than the number of tokens included in the first set of tokens 502 are assumed to be accepted, padding 503 (e.g., null values, predefined constants, etc.) can be added so that each assumption is of the same length.

Once the single generative artificial intelligence model completes rejection sampling on the speculatively generated set of tokens, the single generative artificial intelligence model selects the set of speculatively generated tokens associated with the set of accepted tokens from the first set as input to the single generative artificial intelligence model for another inference round in which tokens are speculatively generated using the single generative artificial intelligence model. In this example, it may be seen that all four tokens in the first set of tokens 502 have been accepted by the single generative artificial intelligence model as a draft verification 512, and thus, the set of tokens 510 may be used for further speculative generation of tokens using the single generative artificial intelligence model.

The process above may be continued until a terminating event occurs. Successive rounds of speculative generation may be based on assumptions of the number of tokens from a previous round of speculative generation being accepted by the single generative artificial intelligence model. For example, as illustrated in FIG. 5, sets of draft tokens 522, 524, 526, and 528 may be generated in the $k+1^{th}$ round of inferencing with the tokens included in the sets of draft tokens being based on a number of speculatively generated tokens beyond the N accepted tokens generated in the $k-1^{th}$ round of inferencing. In this example, it may be seen that the four speculatively generated tokens generated during the $k^{th}$ round of inferencing have been accepted as a draft verification 520, and the tokens N+5 through N+8 may be used for further speculative generation of tokens using the single generative artificial intelligence model.

In some aspects, a terminating event may include the generation of a special token used to denote the end of a response (e.g., that no further tokens can plausibly be included in a response due to the probabilities associated with these tokens falling below a threshold probability value for acceptance). A terminating event may, in some aspects, be reached when a threshold number of tokens have been generated.

In some aspects, when all tokens from a previous round of speculative token generation are rejected by the single generative artificial intelligence model, the process can restart with the last set of accepted tokens, plus a token sampled from a final distribution (e.g., as discussed above), being provided as input into the single generative artificial intelligence model.

Figure 6:
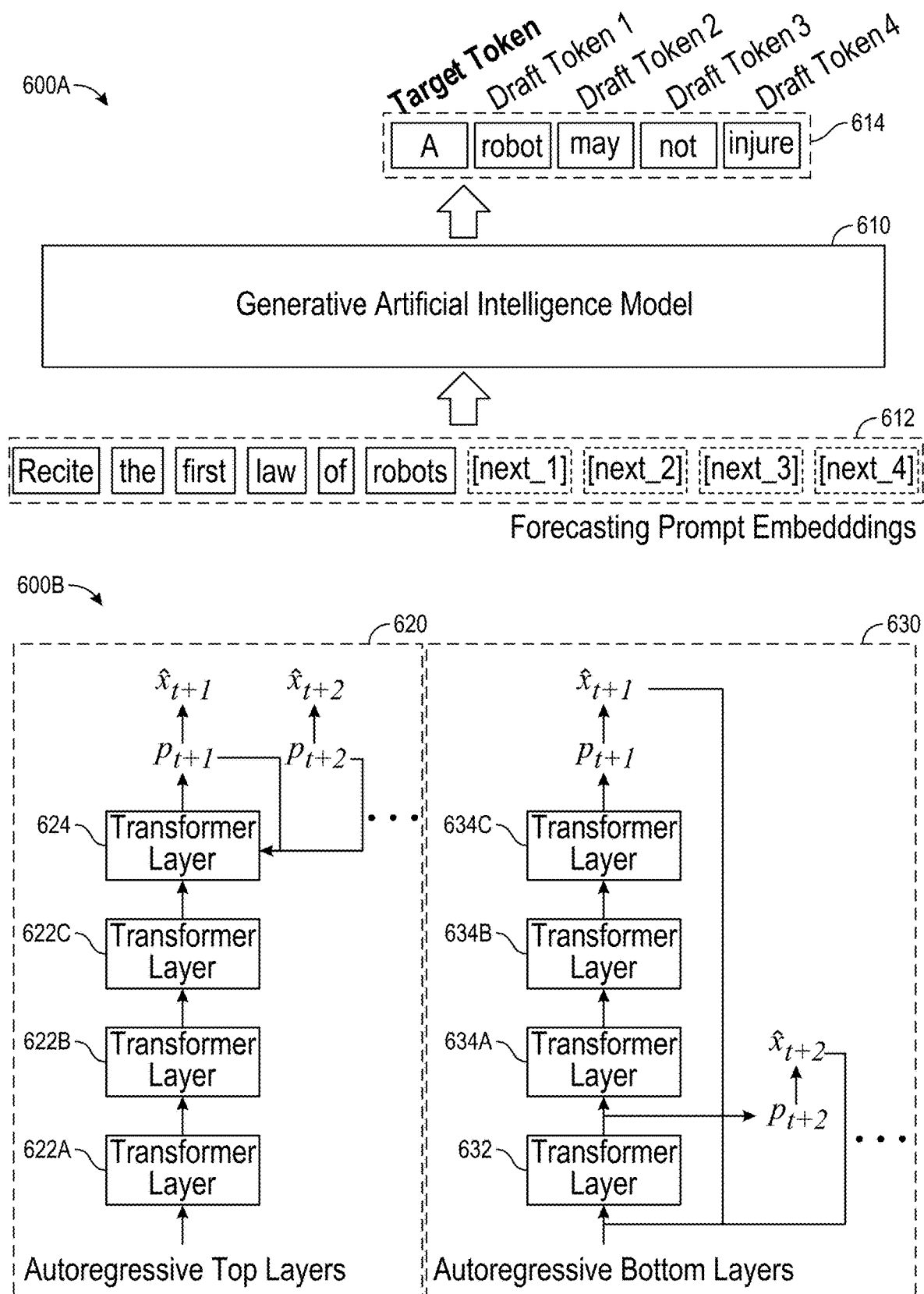
FIG. 6 illustrates example architectures for self-speculative decoding in generative artificial intelligence models, according to aspects of the present disclosure.

FIG. 6 illustrates example architectures 600A, 600B for self-speculative decoding in generative artificial intelligence models, according to aspects of the present disclosure. The example architectures 600A and 600B may both allow for the generation of multiple tokens in any pass through the model, such as in the generation of tokens illustrated in FIGS. 1, 2A, 2B, 3, 4, and 5, as discussed above.

In the example architecture 600A, a generative artificial intelligence model 610 may be trained to generate multiple forecast prompt embeddings 612, appended to an input set of tokens, to allow for parallel generation of multiple output tokens 614. These forecast prompt embeddings may be embeddings that correspond to tokens that are included in a response to an input prompt (including any previously generated and accepted tokens). The generative artificial intelligence model 610 may be a generative artificial intelligence model, such as a pre-trained large language model or other pre-trained generative artificial intelligence model, updated using various fine-tuning techniques. For example, a generative artificial intelligence model used to generate textual responses to textual inputs (also known as a large language model) may be updated using techniques such as low-rank adaptation (LoRA) of large language models.

In the example architecture 600B, generative artificial intelligence models may be implemented as a partial autoregressive model. Inference operations, used to speculatively generate tokens, may be performed using a subset of layers in the partial autoregressive model (e.g., the top n layers of the model or the bottom n layers of the model). In doing so, the layers used to speculatively generate tokens may create context which may allow for causality and/or other relationships to be modeled for the speculatively generated tokens which may be fed as input into the portion of the model that verifies the tokens as valid responses to the input prompt.

The architecture 600B may be implemented in various manners such that autoregressive inference, and the generation of multiple sets of tokens for acceptance and/or rejection, can be generated using a small number of autoregressive layers in a generative artificial intelligence model. In example implementation 620, a generative artificial intelligence model may include a plurality of non-autoregressive layers 622A-622C and an autoregressive layer 624. The layers in the generative artificial intelligence model may be organized into a stack, with the lowest layer in the stack corresponding to the layer that receives an input for processing and the highest layer in the stack corresponding to the layer that generates an output. In the implementation 620, the non-autoregressive layers 622A-622C may be placed at the bottom of the stack, and the autoregressive layer 624 may be placed at the top of the stack. In contrast, in example implementation 630, the layers of the generative artificial intelligence model may be organized such that an autoregressive layer 632 is placed at the bottom of the stack, and non-autoregressive layers 632A-632C are placed at the top of the stack. These autoregressive layers 624 and 632 may operate, for example, in a loop to continually generate and accept tokens to be output as a response to an input prompt (and, in some aspects, previously generated tokens included as a partial response to the input prompt).

Example Operations for Generating Responses to
Input Queries Using Self-Speculative Decoding in
Generative Artificial Intelligence Models FIG. 7 illustrates example operations 700 that may be performed by a computing device to generate a response to an input prompt using generative artificial intelligence models, according to aspects of the present disclosure. The operations 700 may be performed by a device on which at least a generative artificial intelligence model that can act as both a draft model and a target model can be deployed, such as a smartphone, a tablet computer, a laptop computer, a desktop, a server, a cloud compute instance hosted in a distributed computing environment, or the like.

As illustrated, the operations 700 begin at block 710, with generating, based on an input prompt and a generative artificial intelligence model, a first plurality of sets of tokens. In some aspects, the sets of tokens may include sequences of tokens which can be accepted, in part or in full, as a candidate response to the input prompt.

In some aspects, the first plurality of sets of tokens may be represented as a tree data structure. Within this tree data structure, the input prompt may be correspond to a root node. Each set of tokens in the first plurality of sets of tokens may be represented by a navigable path through the tree data structure (e.g., as discussed above with respect to FIG. 3).

In some aspects, the depth of the tree data structure may correspond to a maximum number of tokens generated by a single pass through the generative artificial intelligence model.

In some aspects, the depth of the tree data structure may correspond to a maximum number of tokens generated by a single pass through the generative artificial intelligence model.

In some aspects, the maximum size of the tree data structure may be set based on a computational complexity metric associated with generating a set of tokens by the generative artificial intelligence model.

At block 720, the operations 700 proceed with speculatively generating, using the generative artificial intelligence model, a second plurality of sets of tokens.

At block 730, the operations 700 proceed with selecting, while speculatively generating the second plurality of sets of tokens, a set of tokens from the first plurality of sets of tokens.

In some aspects, selecting the set of tokens from the first plurality of sets of tokens may include selecting a longest sequence of accepted tokens from the first plurality of sets of tokens.

In some aspects, the sets of tokens in the second plurality of sets of tokens may include padding accounting for a number of tokens in the selected set of tokens from the first plurality of tokens. For example, for a number of tokens N included in the each set of tokens from the first plurality of sets of tokens, the selected number of tokens may include between 0 and N tokens. In such a case, the padding included in the sets of tokens in the second plurality of sets of tokens may include no padding (corresponding to acceptance of all N tokens in a set of tokens from the first plurality of tokens), one padding token (corresponding to acceptance of N–1 tokens), two padding tokens (corresponding to acceptance of N–2 tokens), and so on.

In some aspects, to select the set of tokens from the first plurality of tokens, a first token may be rejected at a first level of the tree data structure. Based on the rejection of the first token, n adjusted probability distribution may be generated, and the tree data structure may be pruned by discarding children tokens of the first token from the tree data structure. The children tokens of the first token may be discarded because rejection of the first token generally implies that the children tokens of the first token cannot be valid responses to the input prompt. It may then be determined whether to accept or reject a second token at the first level of the tree data structure based on the adjusted probability distribution.

In some aspects, selecting the set of tokens from the first plurality of sets of tokens may include rejecting each set of tokens in the first plurality of sets of tokens generated by the generative artificial intelligence model. A token may be sampled using the generative artificial intelligence model based on a target distribution that excludes probabilities associated with each set of tokens in the first plurality of sets of tokens. The selected set of tokens from the first plurality of sets of tokens may include the sampled token.

At block 740, the operations 700 proceed with outputting the selected set of tokens from the first plurality of tokens and an associated set of tokens in the second plurality of sets of tokens as a response to the input prompt.

In some aspects, the generative artificial intelligence model comprises a generative artificial intelligence model trained to generate multiple tokens in response to the input prompt based on forecast prompt embeddings.

In some aspects, the generative artificial intelligence model comprises a model including one or more non-autoregressive layers and one or more autoregressive layers. In some aspects, the one or more autoregressive layers may include one or more layers at a top of a stack of layers representing the generative artificial intelligence model. In some aspects, the one or more autoregressive layers may include one or more layers at a bottom of a stack of layers representing the generative artificial intelligence model.

Figure 8:
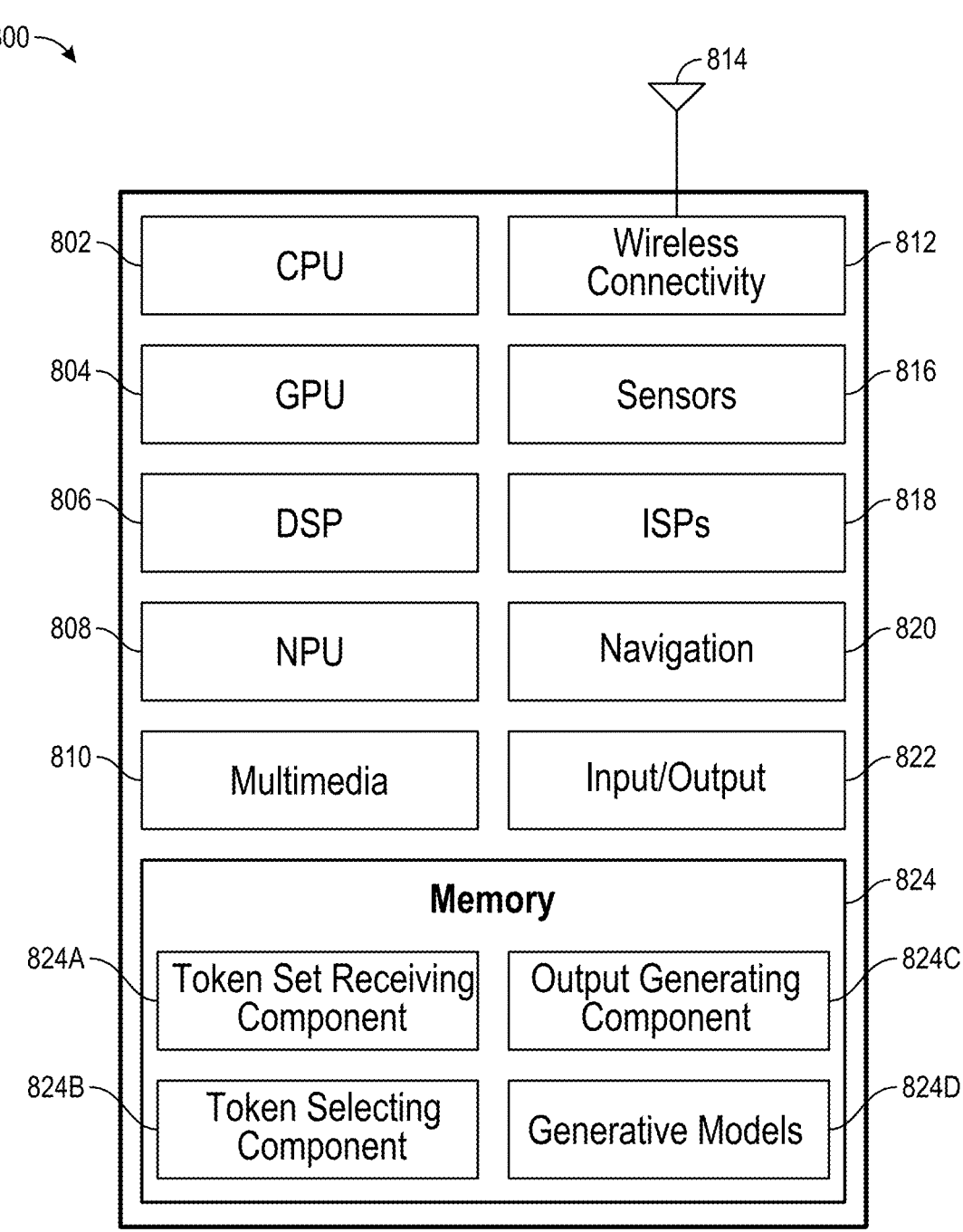
FIG. 8 depicts an example processing system configured to perform various aspects of the present disclosure.

Example Processing Systems for Recursive Speculative Decoding in Generative Artificial Intelligence Models FIG. 8 depicts an example processing system 800 for generating a response to a query input into a generative artificial intelligence model based on recursive speculative decoding, such as described herein, for example, with respect to FIG. 4.

The processing system 800 includes a central processing unit (CPU) 802, which in some examples may be a multi-core CPU. Instructions executed at the CPU 802 may be loaded, for example, from a program memory associated with the CPU 802 or may be loaded from a memory partition (e.g., of a memory 824).

The processing system 800 also includes additional processing components tailored to specific functions, such as a graphics processing unit (GPU) 804, a digital signal processor (DSP) 806, a neural processing unit (NPU) 808, and a connectivity component 812.

An NPU, such as the NPU 808, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples, such NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In some implementations, the NPU 808 is a part of one or more of the CPU 802, the GPU 804, and/or the DSP 806. These may be located on a user equipment (UE) in a wireless communication system or another computing device.

In some examples, the connectivity component 812 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The connectivity component 812 may be further coupled to one or more antennas 814.

The processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

The processing system 800 may also include one or more input and/or output devices 822, such as screens, touch-sensitive surfaces (including touch-sensitive displays), physical buttons, speakers, microphones, and the like.

In some examples, one or more of the processors of the processing system 800 may be based on an ARM or RISC-V instruction set.

The processing system 800 also includes the memory 824, which is representative of one or more static and/or dynamic memories, such as a dynamic random access memory, a flash-based static memory, and the like. In this example, the memory 824 includes computer-executable components, which may be executed by one or more of the aforementioned processors of the processing system 800.

In particular, in this example, the memory 824 includes a token set receiving component 824A, a token selecting component 824B, an output generating component 824C, and generative artificial intelligence models 824D. The depicted components, and others not depicted, may be configured to perform various aspects of the methods described herein.

Generally, the processing system 800 and/or components thereof may be configured to perform the methods described herein.

Figure 9:
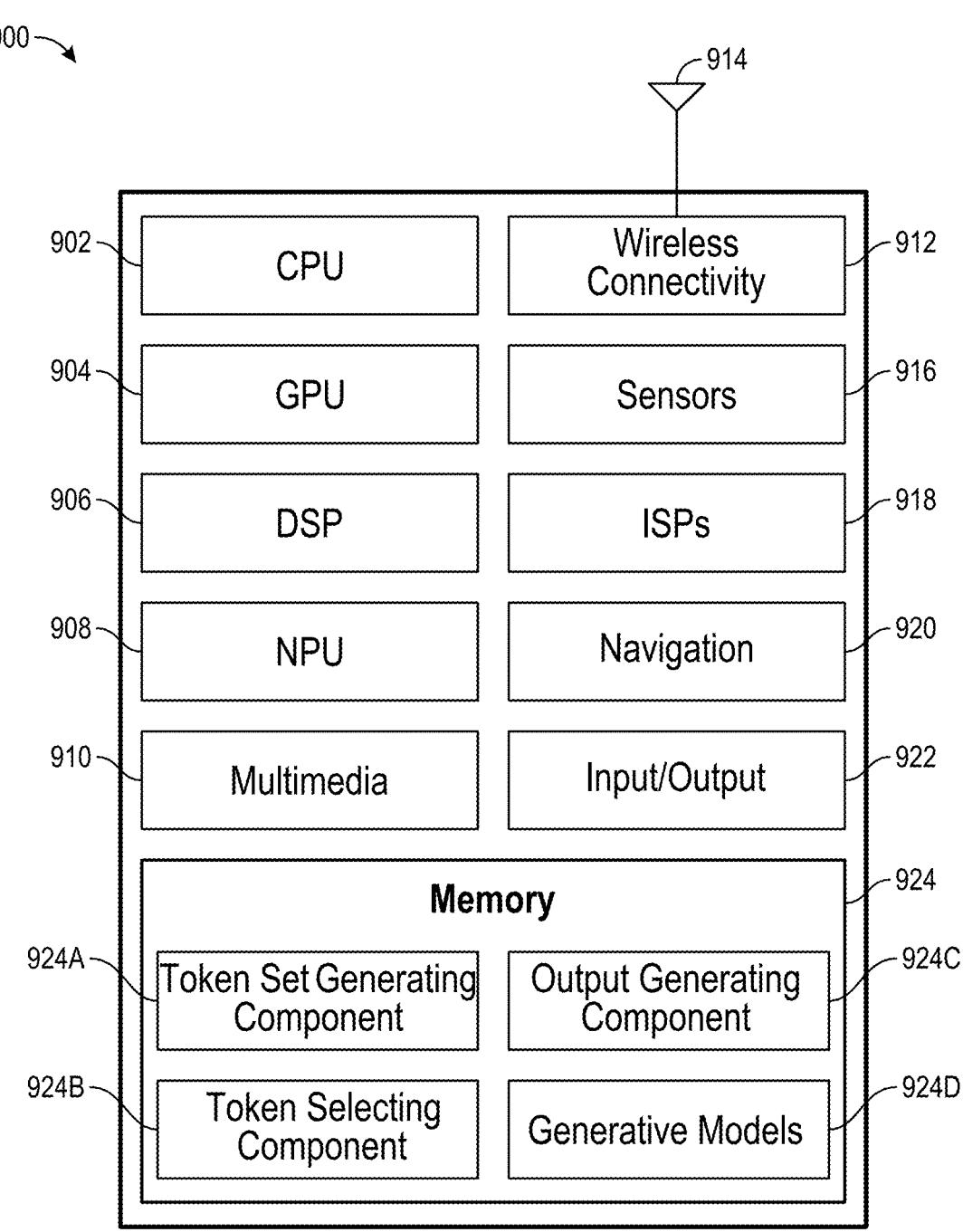
FIG. 9 depicts an example processing system configured to perform various aspects of the present disclosure.

Example Processing Systems for Self-Speculative Decoding in Generative Artificial Intelligence Models FIG. 9 depicts an example processing system 900 for generating a response to a query input into a generative artificial intelligence model based on self-speculative decoding, such as described herein for example with respect to FIG. 7.

The processing system 900 includes a central processing unit (CPU) 902, which in some examples may be a multi-core CPU. Instructions executed at the CPU 902 may be loaded, for example, from a program memory associated with the CPU 902 or may be loaded from a memory partition (e.g., of a memory 924).

The processing system 900 also includes additional processing components tailored to specific functions, such as a graphics processing unit (GPU) 904, a digital signal processor (DSP) 906, a neural processing unit (NPU) 908, and a connectivity component 912.

An NPU, such as the NPU 908, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 908, are configured to accelerate the performance of common machine learning tasks, such as image classification, machine translation, object detection, and various other predictive models. In some examples, a plurality of NPUs may be instantiated on a single chip, such as a system on a chip (SoC), while in other examples such NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In some implementations, the NPU 908 is a part of one or more of the CPU 902, the GPU 904, and/or the DSP 906. These may be located on a user equipment (UE) in a wireless communication system or another computing device.

In some examples, the connectivity component 912 may include subcomponents, for example, for third generation (3G) connectivity, fourth generation (4G) connectivity (e.g., LTE), fifth generation (5G) connectivity (e.g., NR), Wi-Fi connectivity, Bluetooth connectivity, and other wireless data transmission standards. The connectivity component 912 may be further coupled to one or more antennas 914.

The processing system 900 may also include one or more sensor processing units 916 associated with any manner of sensor, one or more image signal processors (ISPs) 918 associated with any manner of image sensor, and/or a navigation processor 920, which may include satellite-based positioning system components (e.g., GPS or GLONASS) as well as inertial positioning system components.

The processing system 900 may also include one or more input and/or output devices 922, such as screens, touch-sensitive surfaces (including touch-sensitive displays), physical buttons, speakers, microphones, and the like.

In some examples, one or more of the processors of the processing system 900 may be based on an ARM or RISC-V instruction set.

The processing system 900 also includes the memory 924, which is representative of one or more static and/or dynamic memories, such as a dynamic random access memory, a flash-based static memory, and the like. In this example, the memory 924 includes computer-executable components, which may be executed by one or more of the aforementioned processors of the processing system 900.

In particular, in this example, the memory 924 includes a token set generating component 924A, a token selecting component 924B, an output generating component 924C, and a generative artificial intelligence model 924D. The depicted components, and others not depicted, may be configured to perform various aspects of the methods described herein.

Generally, the processing system 900 and/or components thereof may be configured to perform the methods described herein.

Example Clauses

Implementation details of various aspects of the present disclosure are described in the following numbered clauses.

Clause 1: A processor-implemented method, comprising: receiving a plurality of sets of tokens generated based on an input prompt and a first generative artificial intelligence model, each set of tokens in the plurality of sets of tokens corresponding to a candidate response to the input prompt; selecting, using a second generative artificial intelligence model and recursive adjustment of a target distribution associated with the received plurality of sets of tokens, a set of tokens from the plurality of sets of tokens; and outputting the selected set of tokens as a response to the input prompt.

Clause 2: The method of Clause 1, wherein the plurality of sets of tokens are organized into a tree data structure.

Clause 3: The method of Clause 2, wherein the input prompt corresponds to a root node of the tree data structure, and each path through the tree data structure corresponds to a different candidate response to the input prompt.

Clause 4: The method of Clause 2 or 3, wherein a number of tokens at a level in the tree data structure is based on a branching factor associated with an immediately prior level to the level in the tree data structure.

Clause 5: The method of any of Clauses 2 through 4, wherein a depth of the tree data structure corresponds to a maximum number of tokens generated by a single pass through the first generative artificial intelligence model.

Clause 6: The method of any of Clauses 1 through 5, wherein a size of each set of tokens is based on a computational complexity metric associated with generating a target set of tokens by the second generative artificial intelligence model.

Clause 7: The method of any of Clauses 1 through 6, wherein the recursive adjustment of the target distribution comprises: determining whether to accept or reject a first token in a set of tokens from the plurality of sets of tokens; and adjusting a probability distribution used to verify a second token in the set of tokens subsequent to the first token based on the determination of whether to accept or reject the first token.

Clause 8: The method of Clause 7, wherein adjusting the probability distribution comprises subtracting a probability value associated with the first token from the probability distribution based on determining to reject the first token.

Clause 9: The method of any of Clauses 1 through 8, wherein selecting the set of tokens from the plurality of sets of tokens comprises: rejecting a first token at a first level of a tree data structure representing the plurality of sets of tokens; generating an adjusted probability distribution based on the rejection of the first token; discarding, from the tree data structure, children tokens of the first token at levels deeper than the first level of the tree data structure; and determining whether to accept or reject a second token at the first level of the tree data structure based on the adjusted probability distribution.

Clause 10: The method of any of Clauses 1 through 9, wherein selecting the set of tokens from the plurality of sets of tokens comprises: rejecting each set of tokens generated by the first generative artificial intelligence model; and sampling, using the second generative artificial intelligence model, a token based on a target distribution that excludes probabilities associated with each set of tokens generated by the first generative artificial intelligence model, wherein the selected set of tokens comprises the sampled token.

Clause 11: The method of any of Clauses 1 through 10, wherein: the first generative artificial intelligence model corresponds to a draft model in a speculative decoding pipeline, and the second generative artificial intelligence model corresponds to a target model in the speculative decoding pipeline.

Clause 12: A processor-implemented method, comprising: generating, based on an input prompt and a generative artificial intelligence model, a first plurality of sets of tokens, each set of tokens in the first plurality of sets of tokens corresponding to a first portion of a candidate response to the input prompt; speculatively generating, using the generative artificial intelligence model, a second plurality of sets of tokens, each set of tokens in the second plurality of sets of tokens corresponding to a second portion of the candidate response to the input prompt based on the first plurality of sets of tokens; while speculatively generating the second plurality of sets of tokens, selecting a set of tokens from the first plurality of sets of tokens; and outputting the selected set of tokens from the first plurality of tokens and an associated set of tokens in the second plurality of tokens as a response to the input prompt.

Clause 13: The method of Clause 12, wherein selecting the set of tokens from the first plurality of sets of tokens comprises selecting a longest sequence of accepted tokens from the first plurality of sets of tokens.

Clause 14: The method of Clause 12 or 13, wherein sets of tokens in the second plurality of sets of tokens include padding accounting for a number of tokens in the selected set of tokens from the first plurality of sets of tokens.

Clause 15: The method of any of Clauses 12 through 14, wherein the first plurality of sets of tokens are represented as a tree data structure and a root node of the tree data structure corresponds to the input prompt.

Clause 16: The method of Clause 15, wherein a depth of the tree data structure corresponds to a maximum number of tokens generated by a single pass through the generative artificial intelligence model.

Clause 17: The method of Clause 15 or 16, wherein a maximum size of the tree data structure is set based on a computational complexity metric associated with generating a set of tokens by the generative artificial intelligence model.

Clause 18: The method of any of Clauses 15 through 17, wherein selecting the set of tokens from the first plurality of sets of tokens comprises: rejecting a first token at a first level of the tree data structure representing the first plurality of sets of tokens; generating an adjusted probability distribution based on the rejection of the first token; discarding children tokens of the first token from the tree data structure; and determining whether to accept or reject a second token at the first level of the tree data structure based on the adjusted probability distribution.

Clause 19: The method of any of Clauses 12 through 18, wherein selecting the set of tokens from the first plurality of sets of tokens comprises: rejecting each set of tokens in the first plurality of sets of tokens generated by the generative artificial intelligence model; and sampling, using the generative artificial intelligence model, a token based on a target distribution that excludes probabilities associated with each set of tokens in the first plurality of sets of tokens, wherein the selected set of tokens from the first plurality of sets of tokens comprises the sampled token.

Clause 20: The method of any of Clauses 12 through 19, wherein the generative artificial intelligence model comprises a generative artificial intelligence model trained to generate multiple tokens in response to the input prompt based on forecast prompt embeddings.

Clause 21: The method of any of Clauses 12 through 20, wherein the generative artificial intelligence model comprises a model including one or more non-autoregressive layers and one or more autoregressive layers.

Clause 22: The method of Clause 21, wherein the one or more autoregressive layers comprise one or more layers at a top of a stack of layers representing the generative artificial intelligence model.

Clause 23: The method of Clause 21 or 22, wherein the one or more autoregressive layers comprise one or more layers at a bottom of a stack of layers representing the generative artificial intelligence model.

Clause 24: A processing system, comprising: at least one memory having executable instructions stored thereon; and one or more processors configured to execute the executable instructions in order to cause the processing system to perform the operations of any of Clauses 1 through 23.

Clause 25: A processing system, comprising: means for performing the operations of any of Clauses 1 through 23.

Clause 26: A non-transitory computer-readable medium having executable instructions stored thereon which, when executed by one or more processors, performs the operations of ay of Clauses 1 through 23.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system comprising:
   at least one memory having executable instructions stored thereon; and
   one or more processors configured to execute the executable instructions in order to cause the processing system to:

generate, based on an input prompt and a generative artificial intelligence model, a first plurality of sets of tokens;

generate, using the generative artificial intelligence model, a second plurality of sets of tokens, based on the first plurality of sets of tokens;

while generating the second plurality of sets of tokens, select, by the generative artificial intelligence model, a set of tokens from the first plurality of sets of tokens; and output, by the generative artificial intelligence model, the selected set of tokens from the first plurality of tokens and an associated set of tokens from the second plurality of sets of tokens as a response to the input prompt.

2. The processing system of claim 1, wherein to select the set of tokens from the first plurality of sets of tokens, the one or more processors are configured to cause the processing system to select a longest sequence of accepted tokens from the first plurality of sets of tokens.

3. The processing system of claim 1, wherein sets of tokens in the second plurality of sets of tokens include padding accounting for a number of tokens in the selected set of tokens from the first plurality of sets of tokens.

4. The processing system of claim 1, wherein the first plurality of sets of tokens is represented as a tree data structure and wherein a root node of the tree data structure corresponds to the input prompt.

5. The processing system of claim 4, wherein a depth of the tree data structure corresponds to a maximum number of tokens generated by a single pass through the generative artificial intelligence model.

6. The processing system of claim 4, wherein a maximum size of the tree data structure is set based on a computational complexity metric associated with generating a set of tokens by the generative artificial intelligence model.

7. The processing system of claim 4, wherein to select the set of tokens from the first plurality of sets of tokens, the one or more processors are configured to cause the processing system to:

reject a first token at a first level of the tree data structure representing the first plurality of sets of tokens;

generate an adjusted probability distribution based on the rejection of the first token;

discard or ignoring children tokens of the first token from the tree data structure; and determine whether to accept or reject a second token at the first level of the tree data structure based on the adjusted probability distribution.

8. The processing system of claim 1, wherein to select the set of tokens from the first plurality of sets of tokens, the one or more processors are configured to cause the processing system to:

reject each set of tokens in the first plurality of sets of tokens generated by the generative artificial intelligence model; and sample, using the generative artificial intelligence model, a token based on a target distribution that excludes probabilities associated with each set of tokens in the first plurality of sets of tokens, wherein the selected set of tokens from the first plurality of sets of tokens comprises the sampled token.

9. The processing system of claim 1, wherein the generative artificial intelligence model comprises a generative artificial intelligence model trained to generate multiple tokens in response to the input prompt based on forecast prompt embeddings.

10. The processing system of claim 1, wherein the generative artificial intelligence model comprises a model including one or more non-autoregressive layers and one or more autoregressive layers.

11. The processing system of claim 10, wherein the one or more autoregressive layers comprise one or more layers at a top of a stack of layers representing the generative artificial intelligence model.

12. The processing system of claim 10, wherein the one or more autoregressive layers comprise one or more layers at a bottom of a stack of layers representing the generative artificial intelligence model.

13. A mobile device comprising the processing system of claim 1.

14. A processor-implemented method, comprising:

generating, based on an input prompt and a generative artificial intelligence model, a first plurality of sets of tokens;

generating, using the generative artificial intelligence model, a second plurality of sets of tokens;

while generating the second plurality of sets of tokens, selecting, by the generative artificial intelligence model, a set of tokens from the first plurality of sets of tokens; and outputting, by the generative artificial intelligence model, the selected set of tokens from the first plurality of tokens and an associated set of tokens from the second plurality of sets of tokens as a response to the input prompt.

15. The method of claim 14, wherein selecting the set of tokens from the first plurality of sets of tokens comprises selecting a longest sequence of accepted tokens from the first plurality of sets of tokens.

16. The method of claim 14, wherein sets of tokens in the second plurality of sets of tokens include padding accounting for a number of tokens in the selected set of tokens from the first plurality of sets of tokens.

17. The method of claim 14, wherein the first plurality of sets of tokens is represented as a tree data structure and wherein a root node of the tree data structure corresponds to the input prompt.

18. The method of claim 17 wherein a depth of the tree data structure corresponds to a maximum number of tokens generated by a single pass through the generative artificial intelligence model.

19. The method of claim 17, wherein a maximum size of the tree data structure is set based on a computational complexity metric associated with generating a set of tokens by the generative artificial intelligence model.

20. The method of claim 17, wherein selecting the set of tokens from the first plurality of sets of tokens comprises:

rejecting a first token at a first level of the tree data structure representing the first plurality of sets of tokens;

generating an adjusted probability distribution based on the rejection of the first token;

discarding or ignoring children tokens of the first token from the tree data structure; and determining whether to accept or reject a second token at the first level of the tree data structure based on the adjusted probability distribution.

21. The method of claim 14, wherein selecting the set of tokens from the first plurality of sets of tokens comprises:

rejecting each set of tokens in the first plurality of sets of tokens generated by the generative artificial intelligence model; and sampling, using the generative artificial intelligence model, a token based on a target distribution that excludes probabilities associated with each set of tokens in the first plurality of sets of tokens, wherein the selected set of tokens from the first plurality of sets of tokens comprises the sampled token.

22. The method of claim 14, wherein the generative artificial intelligence model comprises a generative artificial intelligence model trained to generate multiple tokens in response to the input prompt based on forecast prompt embeddings.

23. The method of claim 14, wherein the generative artificial intelligence model comprises a model including one or more non-autoregressive layers and one or more autoregressive layers.

24. The method of claim 23, wherein the one or more autoregressive layers comprise one or more layers at a top of a stack of layers representing the generative artificial intelligence model.

25. The method of claim 23, wherein the one or more autoregressive layers comprise one or more layers at a bottom of a stack of layers representing the generative artificial intelligence model.

26. A processing system comprising:

means for generating, based on an input prompt and a generative artificial intelligence model, a first plurality of sets of tokens, each set of tokens;

means for generating, using the generative artificial intelligence model, a second plurality of sets of tokens;

means for selecting by the generative artificial intelligence model, while generating the second plurality of sets of tokens, a set of tokens from the first plurality of sets of tokens; and means for outputting, by the generative artificial intelligence model, the selected set of tokens from the first plurality of sets of tokens and an associated set of tokens from the second plurality of tokens as a response to the input prompt.

27. A non-transitory computer-readable medium having executable instructions stored thereon which, when executed by one or more processors, perform an operation comprising:

generating, based on an input prompt and a generative artificial intelligence model, a first plurality of sets of tokens;

generating, using the generative artificial intelligence model, a second plurality of sets of tokens;

while generating the second plurality of sets of tokens, selecting, by the generative artificial intelligence model, a set of tokens from the first plurality of sets of tokens; and outputting, by the generative artificial intelligence model, the selected set of tokens from the first plurality of tokens and an associated set of tokens from the second plurality of tokens as a response to the input prompt.

\* \* \* \* \*